United States Patent [19]

Carter, II

[11] 4,204,127

[45] May 20, 1980

[54] LOAD REGULATION AS PART OF AN ADAPTIVE PRIORITY DETERMINATION POWER DEMAND CONTROL SYSTEM

[75] Inventor: Woodward C. Carter, II, Maitland, Fla.

[73] Assignee: Westinghouse Electric Corp., Pittsburgh, Pa.

[21] Appl. No.: 896,262

[22] Filed: Apr. 14, 1978

[51] Int. Cl.$^2$ ............... G05B 13/02; G05B 11/32
[52] U.S. Cl. .................................. 307/39; 307/35; 364/492
[58] Field of Search .......... 307/11, 38, 39, 52, 307/31, 34, 35; 364/492, 464, 300, 493

[56] References Cited

U.S. PATENT DOCUMENTS

| | | | |
|---|---|---|---|
| 3,387,121 | 6/1968 | Maczuzak | 364/492 |
| 3,602,703 | 8/1971 | Polenz | 364/300 |
| 3,714,453 | 1/1973 | Delisle | 307/41 |
| 3,872,286 | 3/1975 | Putman | 364/464 |
| 4,064,485 | 12/1977 | Leyde | 364/492 |

Primary Examiner—Michael L. Gellner
Assistant Examiner—S. D. Schreyer
Attorney, Agent, or Firm—C. M. Lorin

[57] ABSTRACT

In a power utilization system having loads drawing energy from a utility company, some loads are adjustable and, as part of computerized power demand control system, loads are regulated as well as switched ON or OFF in order to meet an assigned power demand limit. The adjustable loads draw power in accordance with a local supply controller, such as a tap changer, but regulated amounts of power are established by the computer with a set point which is a function of the demand error calculated in an outer loop by the power demand control system and maintained by the computer in a closed loop from an individual power meter and with the established set point. The priority schedule and error computations take into account the amounts of power drawn by adjustable loads as well as the amounts drawn by loads which can be shed, or reconnected.

16 Claims, 14 Drawing Figures

LOAD REGULATION AS PART OF AN ADAPTIVE PRIORITY DETERMINATION POWER DEMAND CONTROL SYSTEM

BACKGROUND OF THE INVENTION

The invention relates in general to power demand control for switching loads according to a priority schedule in a plant facility supplied with energy from a utility company so as to keep the demand at the end of a period of control within a preassigned demand limit. The invention relates in particular to a power demand control system in which the priority schedule is changed or fixed in time in accordance with the dynamics of operation of at least one of the loads to be switched, or in accordance with operator initiated commands. Such adaptive load priority determination is particularly applicable to arc furnace installations, since in such installations the decision to switch, or not to switch, an arc furnace should not only take into account the requirements of power demand limit but also the economics and requirements of production.

It is known from U.S. Pat. No. 3,602,703 of T. R. Polenz to switch a load of highest priority and control the power available to be switched after such switching by considering the known pattern of additional loads, so that so much of the successive stages of such an additional load can be switched as the remaining available power within an assigned demand limit. Typically, such loads can be individually controlled so as to stretch or contract the known pattern of energy consumption.

It is known from U.S. Pat. No. 3,714,453 of J. Delisle et al to control switching of a plurality of loads on the basis of the power consumed by the loads and of the demand derived from the utility company.

The prior art of power demand control has been described and a technique used has been disclosed in U.S. Pat. No. 3,872,286 of R. Putman issued on Mar. 18, 1975. For the purpose of the description hereinafter of the preferred embodiment of the present invention, the description and drawings of the Putman patent are hereby incorporated by reference. The general technique of power demand control consists in predicting at successive operative points during a demand period, of for instance 15 minutes, the expected demand at the end of the period so as to derive an error (by reference to a demand limit not to be exceeded). Shedding (switching OFF) or restoring (switching ON) of loads according to a priority table is performed by a computer on the basis of a computation of such demand error, which can be positive or negative. The Putman patent discloses a more refined controlling approach by the calculation of a residual error after calculation of a predicted result due to control of selectable loads, such residual error being used in subsequent calculations to determine if additional loads should be manipulated.

While very effective in adjusting the power demand during each demand period within the limit of an assigned target, the control technique of the Putman patent has been mainly applied in the past to derive substantial savings from the control of a category of loads having a controllable status as opposed to other loads left totally out of control, the latter because of constraints imposed on the loads, or because production requirements dictate that these other loads remain unaffected by power demand control. This all or nothing approach with respect to control of the main units of production reduces the overall efficiency of power demand control. If indeed substantial savings can be derived from controlling under a priority schedule many loads which are supporting the production of a user's plant, it is desirable to include the main production units among the loads having a controllable status from a point of view of power demand control.

An object of the present invention is to provide a power demand control system which includes besides its sheddable and reconnectable loads, loads which are adjustable production units. Typically, these will be a relatively few loads of relatively large size, as opposed to numerous, small loads.

Another object of the present invention is to provide, in accordance with a priority schedule, switching or adjustment of loads including production units in order to more closely meet a power demand limit not to be exceeded at the end of any of successive demand periods.

A further object of the present invention is to combine scheduling of sheddable and reconnectable loads for limiting the demand of power in a user's facility with scheduling for adjustable production loads, the load selection being in accordance with the production process within the facility.

Still another object of the present invention is to determine with a computer the initiation and the termination, and/or the level of consumption of a plurality of production processes consuming energy in order to maximize production under the constraint of an assigned power demand limit.

SUMMARY OF THE INVENTION

In a power utilization system including loads drawing energy from a utility company, some loads can be adjusted in order to draw variable amounts of power and such loads may be provided with individual power meters. In accordance with the invention, as part of a power demand control system having an assigned demand limit, constant power is maintained on an adjustable load by the computer in response to the power rate indicated by the individual meter and by reference to a set point, and such set point is established and modified in accordance with the overall power demand scheme so as to minimize a predicted demand error at the end of one of successive control periods. However, if the load is sufficiently predetermined so that the adjusting means adequately determines the load power level, the individual power meter may be omitted.

The invention is particularly applicable to arc furnaces. The invention permits regulatory action in controlling simultaneous operation of several arc furnaces, the consumption and/or the number of arc furnaces effectively in service at a given time being a function of an assigned power demand limit and a function of the accumulation of power consumed during integrated portions of demand periods of control, thereby to maximize the utilization of the overall arc-furnace capacity within a given industrial plant.

The invention is used with units of production, selected according to a priority scheme, which can be regulated but it can also be used within the context of power demand control extended to other types of controllable loads, such as loads that can only be switched ON or OFF, or loads having constraints making them available for control only when the attached constraints have been lifted as a result of fulfillment of assigned operative requirements, such as the expiration of prescribed times ON or OFF, or by any externally lifted prohibition, or which have in any form regained their degree of freedom.

In a preferred application, the technique of computerized power demand limit of the prior art is applied to advantage to the control of arc furnaces in a plant supplied with electrical power from a utility company.

In operation, the synchronizing ("DEMAND") pulse from the plant KWH meter resets the computer demand period timer and actual timing of the period is from the computer real-time clock. KWH pulses from the plant KWH meter are received by the controller as interrupts (or as frequently scanned contact closure inputs (CCI's)) which represent KWH consumed. These interrupts initiate the calculation of the total KWH in the period in relation to the elapsed time of the period. From these data an actual point on the demand curve is determined, and the actual slope of the curve is determined using a weighted average of the last three pulse periods (last four pulses). This actual slope is used to predict final demand at the end of the period. Depending on the demand prediction, time into period, and values of various furnace constraints and control parameters, the computer may either lower or raise the set point of an adjustable load, or with an OFF/ON status load it may open or close the furnace power on permissive contacts to force the demand at the end of the control period toward the demand limit. It is considered that each load has a predetermined response time and this time is taken into account in determining, according to the present invention, whether to regulate (adjust), shed, or add, a load.

The control system calculates when to regulate the load upward or downward and when to shed or add loads. With adjustable loads (and optionally with ON/OFF loads that are ON), the determination is based on the actual current value of the load itself. However, since adjustable loads are set only in between a maximum (HISET) and a minimum (LOSET) level of consumption, the highest and the lowest values are used as actual consumption when the upper and the lower limits, respectively, have been reached.

As a result, according to the present invention, power demand limit control in a plant is integrated with control of the production units, such as arc furnaces, as part of an adaptive control process thereof.

BRIEF DESCRIPTION OF THE DRAWINGS

The invention will now be described in the context of the supply of electrical energy by a utility power supply company to an industrial plant including a plurality of electrical furnaces, and reference shall be made to the accompanying drawings in which.

GENERAL CONSIDERATIONS APPLICABLE TO THE PREFERRED EMBODIMENT

For the sake of clarity and for the purpose of illustration only, the present invention will be described in the context of the power demand control system of U.S. Pat. No. 3,872,286, and the description of this patent is herein incorporated by reference.

Figure 1:
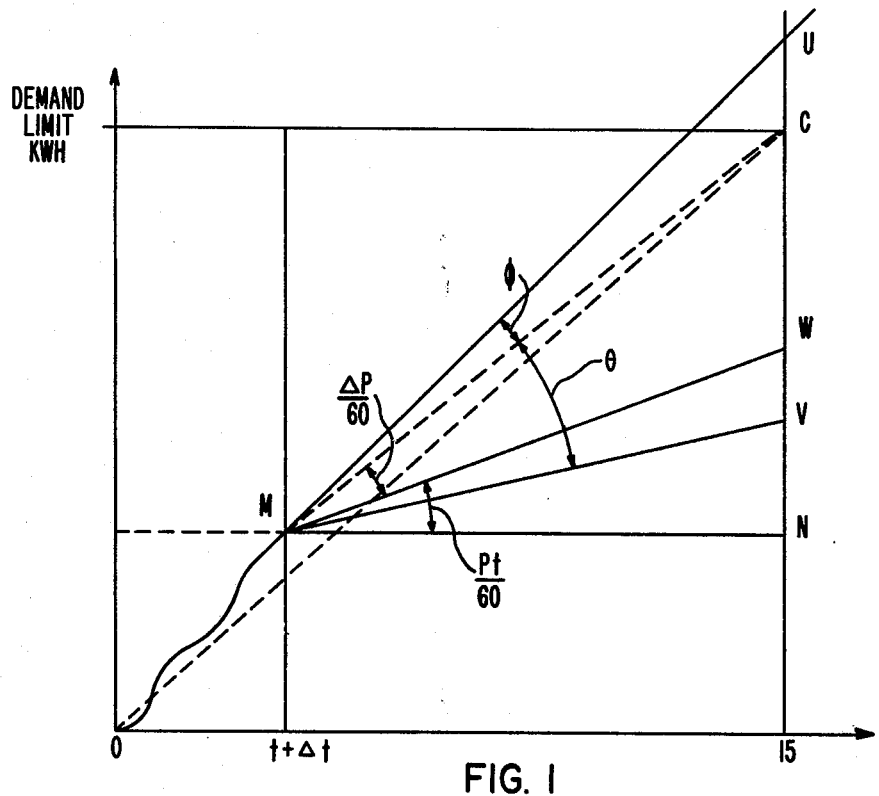
FIG. 1 illustrates diagrammatically the principle of calculation of the demand error used in a control system of the prior art for power demand control.

FIG. 1 illustrates the principle of calculation of the error for any point M along the trajectory during a demand period of 15 minutes. A clock installed by the power supply company determines the initial time of each demand period, (or the final time of a preceding demand period). The watthour meter provides a "KWH pulse" which represents the magnitude of the power which has been consumed during a certain time $\Delta t$ corresponding to a full rotation of the disc of the meter, thus representing a constant increment or unit of energy (KWH). Thus, the $\Delta t$ interval appearing along the time axis is essentially variable. This time interval is detected as a representation of the slope at point M and it represents the power $P_t$ in KW hour/hour. If the load of the plant is maintained in the same condition until the end of the 15 minute period, the energy curve will follow the tangent MW. However, the Demand Limit is set at C, therefore there is an error CW by default, which in terms of power is:

$$\Delta P = \frac{(60) \times CN}{15 - t} = P_t$$

as is evident from the geometry of triangles MNC and MWC. Having determined Slope=$\Delta P/60$ by triangulation, and the sign of the error, depending upon whether the intersection point W is above ($-$) or below ($+$) the target C, control is effected by selectively adding or shedding suitable loads in the plant. In order to more closely follow the target, a deadband may be provided on either side of the trajectory by defining two angles $\phi$ and $\theta$ which should not be exceeded. The deadband will permit effective demand control while avoiding excessive control activity as long as the projected tangent remains within the two limits MU and MV (FIG. 1) defined by the angles. The upper limit MU will represent the "decrease vector" and the lower limit MV of the deadband will represent the "increase vector" for control. Such deadband can be made variable as shown in the Putman patent.

It will be hereinafter assumed that the power demand can be controlled by a plurality of loads which in part are adjustable and in part can be switched ON, or OFF. However, by ON and OFF, it is understood that in a general sense the loads need not be switched by electrical connecting, or disconnecting. A power consumption can be increased or decreased by mechanical connection or disconnection of the load as well, such as by means of a clutch or valve actuation.

When several loads are available for being switched ON or OFF, there is a possibility that at times a load switched off by the controller may already be off. The particular load to be switched on by the controller might have been previously put out of service. It is also possible that control of the demand be prevented by an overriding and external control equipment associated with the load, as is usual with air conditioners, chillers, or air compressors, for instance. Other types of constraints can be found in the particular industrial plant of a customer to a power company.

The selection of a load not only depends upon the overall status of the different loads, but also upon the behavior of any particular load in the user's plant. The control system therefore provides for a dynamic allocation of priorities for the selection of the loads to be controlled at any particular time.

The system also provides for relative control, rather than an absolute control of the loads, any selected and controlled load change being effected independently from the base load and from non-controlled loads.

The control system may also take into account the established constraints. For instance, besides adjustable loads and interruptible loads which can be selected to be shed or to be added, there may be in the plant loads having a non-controllable status, which otherwise could defeat the control system. However, the control system may also limit its own capability of switching loads in order to accept the non-controllable loads as a favorable factor of correction when in the demand limit control mode, in particular by making use of a deadband.

The control system in the demand limit control mode may moreover call for the determination of the constraints either off-line or on-line in order to be able to ascertain with improved accuracy the anticipated effect of control and prepare for the right decision in selecting the loads to be controlled at a given instant or for an emergency action by the present control operation.

Further, while providing load regulation and/or for shedding loads or adding loads to limit the total power demand as desired at the end of any given demand period, the control system takes steps in order to maximize the needs for particular loads of the user. To this effect control might not be exerted during a first portion of the demand period, on the assumption that sufficient possibilities of meeting the objectives are still left and are available, as a result of an improved control and improved selection, in the latter part of the demand period. Control is performed, during a second and major portion of the demand period. In addition, during a third field of control, a temporary target below the objective can be imposed for control until a certain time limit relatively close to the end of the demand period and when such limit has been reached, the bias so established is progressively reduced to zero until the end of the demand period, at which time the demand limit is substantially achieved.

Figure 2:
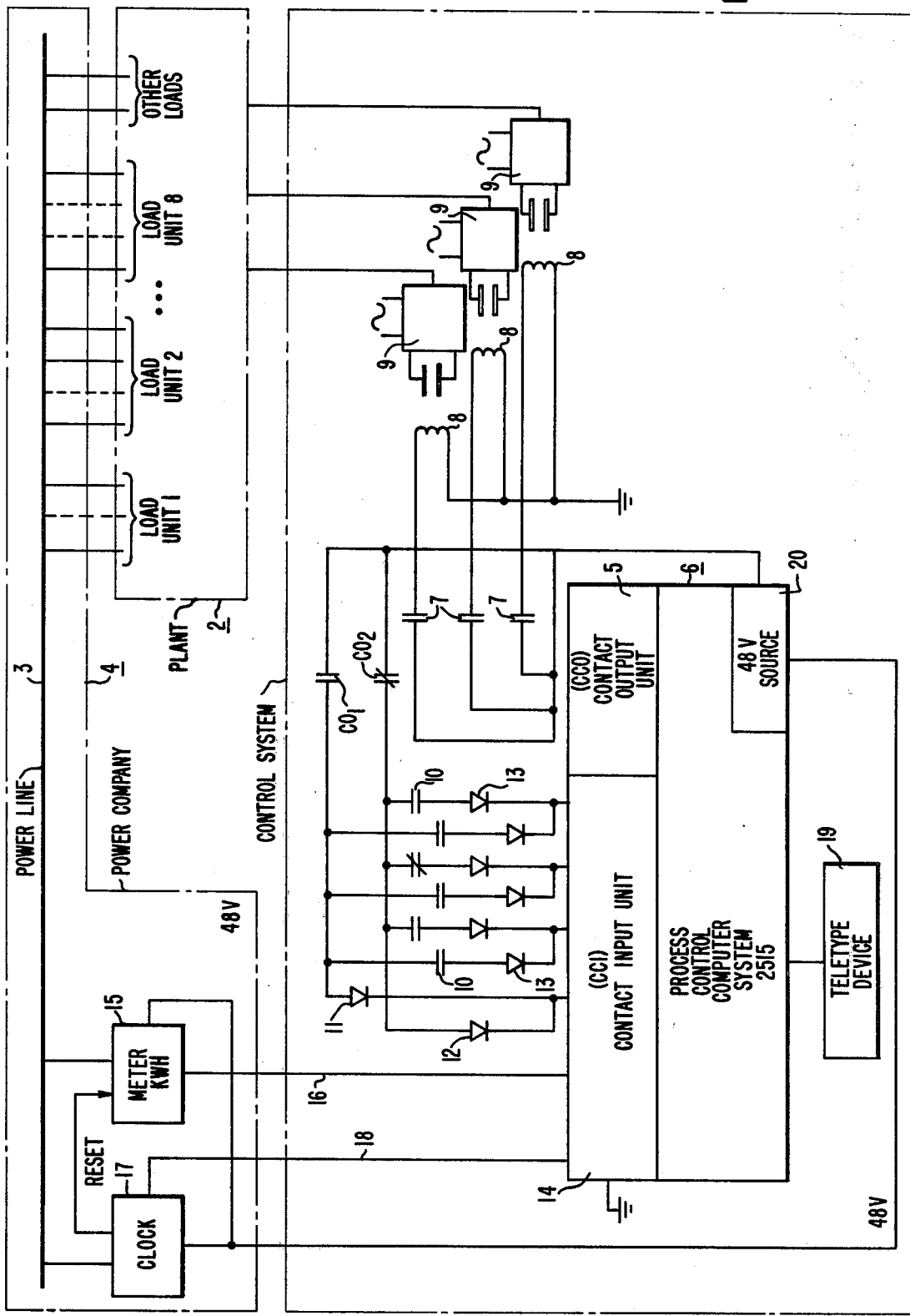
FIG. 2 is an overview of the control system used in a control system of the prior art for power demand control.

Referring to FIG. 2 there is shown an overview of the control system 1 according to the present invention applied to the control of the loads of a plant 2 supplied with electrical power on the power supply lines 3 of a power supply.

Referring to FIG. 2, the loads are controlled by a contact output unit 5, which is part of a process control computer system 6. The contact output unit 5 does operate a plurality of load contact outputs 7, each of which closes the energizing circuit of a corresponding relay 8 to actuate the switching element 9 of a load. Such switching element may be the starter of an electrical motor, the plunger of the valve of a compressor, etc.

When a load is in the switched ON condition, a corresponding status contact interrupt 10 may be closed as shown on FIG. 2, with the contacts being arranged so as to correspond to the loads. There is shown in FIG. 2 illustratively a 'multiplex' scheme with two such groups of contacts with one group being associated with a diode 11 and one scan contact output CO1, and the other group being associated with a diode 12 and another scan contact output CO2. Respective diodes 13 are connected in circuit with corresponding status contact interrupts 10 to establish a circuit from a 48 V source 20 provided by the computer system, to ground with the associated diode, 11 or 12. As shown on FIG. 2, concurrent closing of one scan contact output such as CO2 and one particular status contact interrupt 10, such as shown on the Figure, permits identification by the interrupt unit 14 of the status of the particular contact as being one of Group 2 (CO2 on the Figure).

In order to control the power demand by shedding or adding loads, the control system 1 is responsive to the power consumption continuously recorded by the meter 15 of the power supply company. The process control computer receives over a line 16 the KWH pulse which as a $\Delta t$ characterizes the consumption at any particular instant within the demand period. The power supply company also provides a clock 17 which determines the beginning and the end of each demand period. In the instant case it is assumed that each such demand period lasts 15 minutes. For each turn of the disc of the meter 15 there is a pulse generated which will be hereinafter called "KWH pulse". The succession of these pulses represents on a time scale the energy consumed for one turn of the disc. The process control computer system 6 through the interrupt (contact closure input) unit 14 assesses the status of the status contact interrupts 10, and more generally, monitors all the input data fed into the computer system regarding the individual loads in the plant with their constraints, effectuates calculations, makes decisions which are converted, after each of the above-mentioned KWH pulses, into whatever load control action is necessary through the controlled operation of the relays 8.

Included as part of the control system 1, is the process control computer system 6. This computer system typically is a W-2515 under its trade name. It can be a digital computer system, such as a Prodac 2000 (P2000) sold by Westinghouse Electric Corporation. A descriptive book entitled "Prodac 2000 Computers Systems Reference Manual" has been published in 1970 by Westinghouse Electric Corporation and made available for the purpose of describing in greater detail this computer system and its operation. The input systems, associated with the computer processor are well known and include a conventional contact closure input system to effectuate scanning of the contacts or other signals representing the status of the equipment. Also, operator controlled and other information input devices and systems are provided such as the teletypewriter 19 shown in FIG. 2. The contact closure output system is also conventional and part of the Prodac 2000 general purpose digital computer system sold.

The computer system used in the control system according to the invention includes both Hardware and Software. For instance, the interrupt unit 14 is associated with an interrupt handler. Software is being used as a convenient means of quickly and efficiently performing operations as required in monitoring data, doing calculations, making decisions and translating treatment of information into control action within the short time intervals determined by the recurrent transmission of KWH pulses from the power supply company meter 15.

It is observed that the inputs consist of interrupts (internally generated via frequently scanned CCI's or external EI's) which are successively handled by the process interrupt handler. One interrupt will receive the 48 V DC pulse generated by the external clock and is used to reset the associated registers in the computer when it is received. Another interrupt will receive a train of 48 V DC pulses transmitted by the meter 15, each pulse representing KWH (or KVAH) consumed. Another interrupt could be reserved for a second KWH meter if needed. Three other interrupts (the scan contact interrupts 10 of FIG. 2) could be used to receive a status which corresponds to the status of one load contact in the plant and belongs to one group of three associated with one scan contact output (CO1, CO2 on FIG. 2). The units of production under control may be provided with individual power meters beside the main company meter. This is the case in particular for the adjustable loads.

The normal operator interface with the system will be via a teletypewriter 19. This device will also provide a log of system performance together with any other messages that may be required. Via the typewriter keyboard the operator will also be able to change the values of various constants relating to the system as a whole or to individual items of equipment. The time and date and on-peak and off-peak demand levels can also be changed using the same keyboard.

The system will receive an interrupt from the clock at the beginning of each demand period together with a KWH pulse from the KWH (or KVAH) meter for each revolution of the disc. In response to a clock pulse the program puts out data to be printed out for the preceding demand period. All registers are initially cleared in which accumulated values are stored including time into period and KWH during the period. Prorated values of time and KWH are stored in those registers when the KWH pulse does not coincide with the clock pulse.

There is no control in the first field and the slope varies only with the loads. There is no need for a calculation of the slope at any point of the trajectory. Although there is no control during the first field, the status of certain of the interruptible loads may have changed during that time. For instance, the operator may have introduced a new load, or a load could have reached the end of the production process. Therefore, the control system calls for the CO handler which is the software counterpart of the contact unit 5 (FIG. 2). Thus, a bid is made for the CO handler in order to implement the status of the contact outputs established by the previous iteration. The system then returns to the task handler. When the first field ends the second field is established. The invention will be now considered in this particular context, and the preferred embodiment will be described herebelow and illustrated as a power demand limit control system applicable to arc furnaces in a plant.

DESCRIPTION OF THE PREFERRED EMBODIMENT

Figure 3:
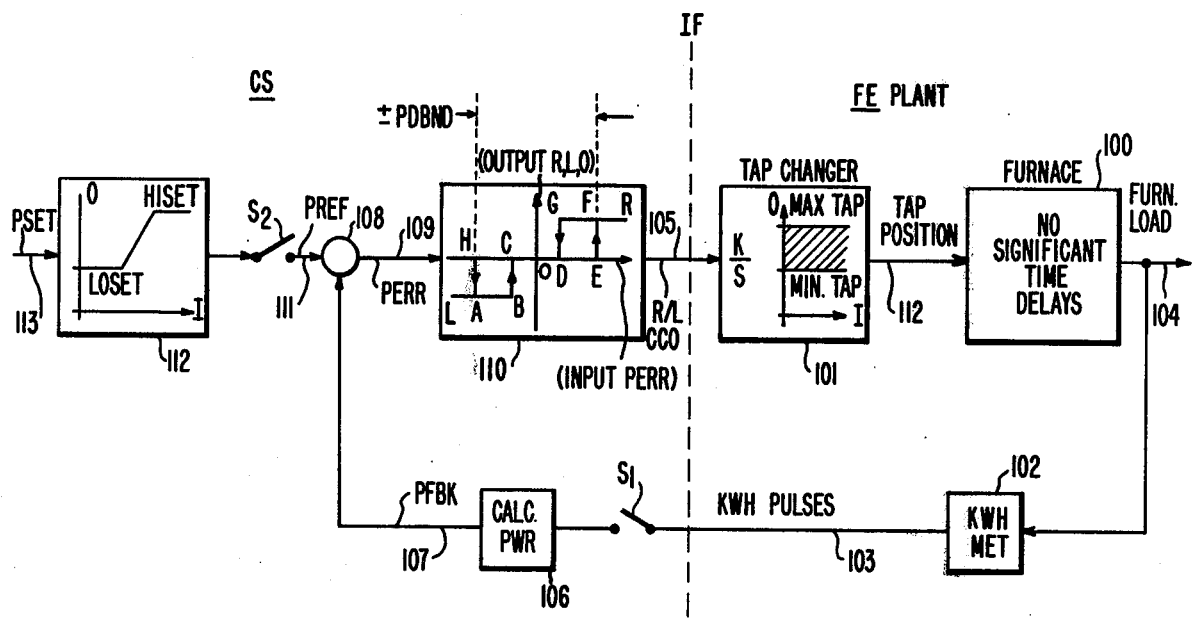
FIG. 3 shows a computer regulated and controlled adjustable load according to the invention.

Referring to FIG. 3, a furnace 100 equipped with a tap changer 101 is shown automatically regulated by an individual closed loop to maintain a constant KW consumption, the value of such KW consumption being set at 113. An individual KWH meter 102 indicates the KWH consumed by furnace 100. Upon each turn of meter 102 a KWH pulse is sent by meter 102 on line 103, and such pulses are recurring in succession at a rate which depends upon the level of consumption at the output 104 of the furnace. The control input 105 to tap changer 101 and the output 103 from the furnace meter 102 extend across the interface IF between the furnace equipment FE in the plant, on the right side of FIG. 3, and a computerized portion of the power demand control system CS shown on the left side of FIG. 3. The succession of KWH pulses on line 103 is, on the computer side (CS), converted into a representation of power by 106, thereby to provide on line 107 a feedback signal (PFBK) which is representative of the power consumed by the furnace. It is assumed at this point that the computer system CS requires at a given time a certain amount of kilowatts to be drawn by furnace 100. The requirement is expressed on line 113 by PSET. The computer converts this command into a control set point signal PREF after conversion by the transfer function shown at 112. The function is usually linear between an upper limit HISET and a lower limit LOSET. Therefore, whenever the demand for kilowatts made by the computer onto furnace 100 is more than HISET, the requirement will not be more than the HISET amount of kilowatts, which is all that the furnace should be adjusted to provide. In other words, PREF in such case equals HISET. The same can be said downward for LOSET. If LOSET is all that the furnace consumption should be reduced to, PREF equals LOSET. In between, PSET will be a fraction of the difference between HISET and LOSET. With PREF being so established the difference between PFBK and PREF is the error in the closed loop to be compensated in order that power on line 104 be in accordance with the set point PREF. Such compensation is effected in the power regulating loop with a deadband as shown by function 110 representing the output (R for raise, L for lower and O for no action) as a function of the input (PERR). The power regulating loop is a bi-directional ON/OFF control loop with error deadband PDBND. As a result, on line 105 the computer algorithm causes the tap changer to be moved in the desired direction. As shown in block 101, tap adjustment is between a maximum and a minimum position (MAXTAP and MINTAP). The transform function is K/S. Effective furnace power adjustments are obtained via line 112 inside furnace 100. Switches $S_1$, $S_2$ on lines 103 and 111, respectively, symbolize the fact that the algorithm for furnace power adjustment of furnace 100 is run periodically, usually each time a KWH pulse occurs from meter 102.

Figure 4:
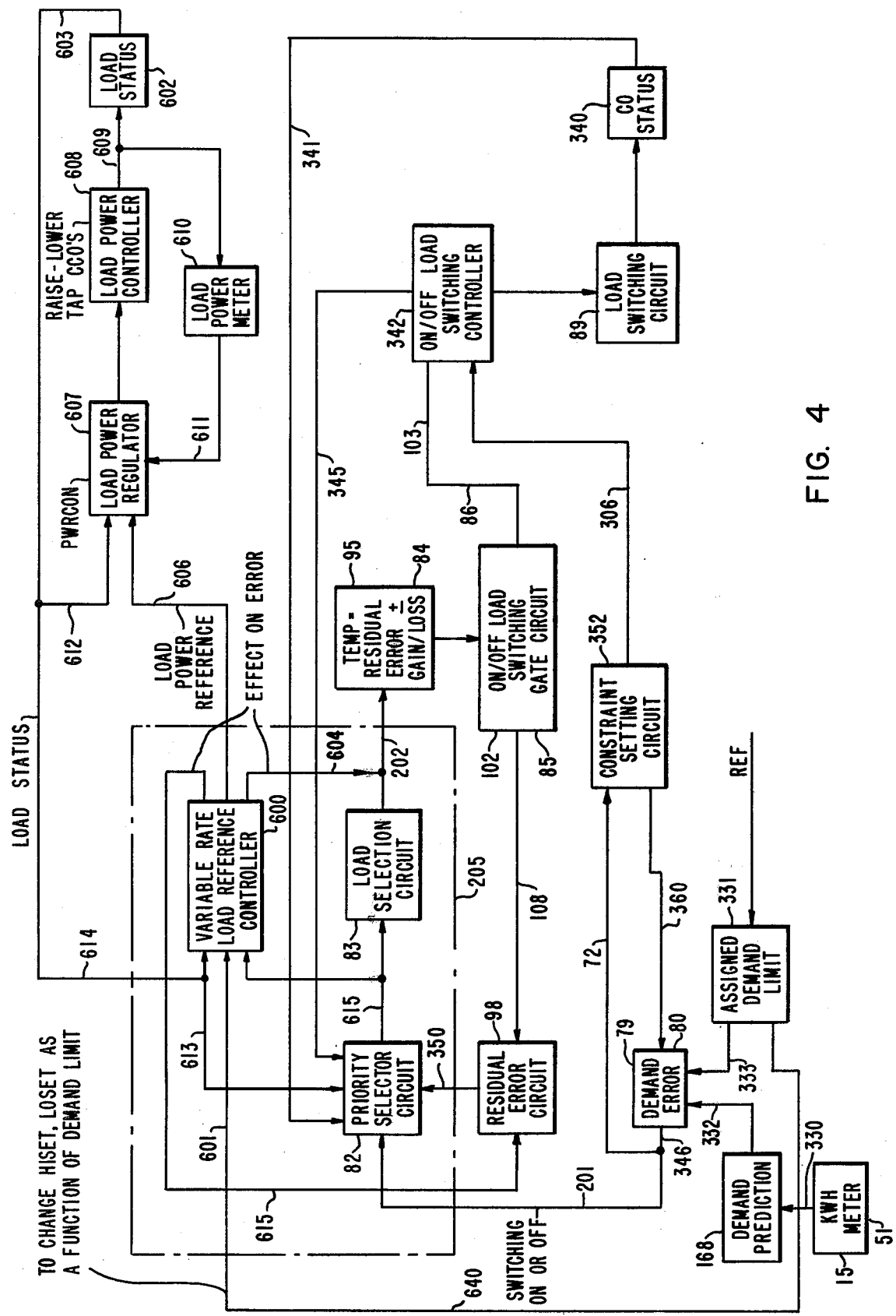
FIG. 4 explains in diagram form the method of control used for power demand control with computer controlled adjustable loads in accordance with the invention.
Figure 5:
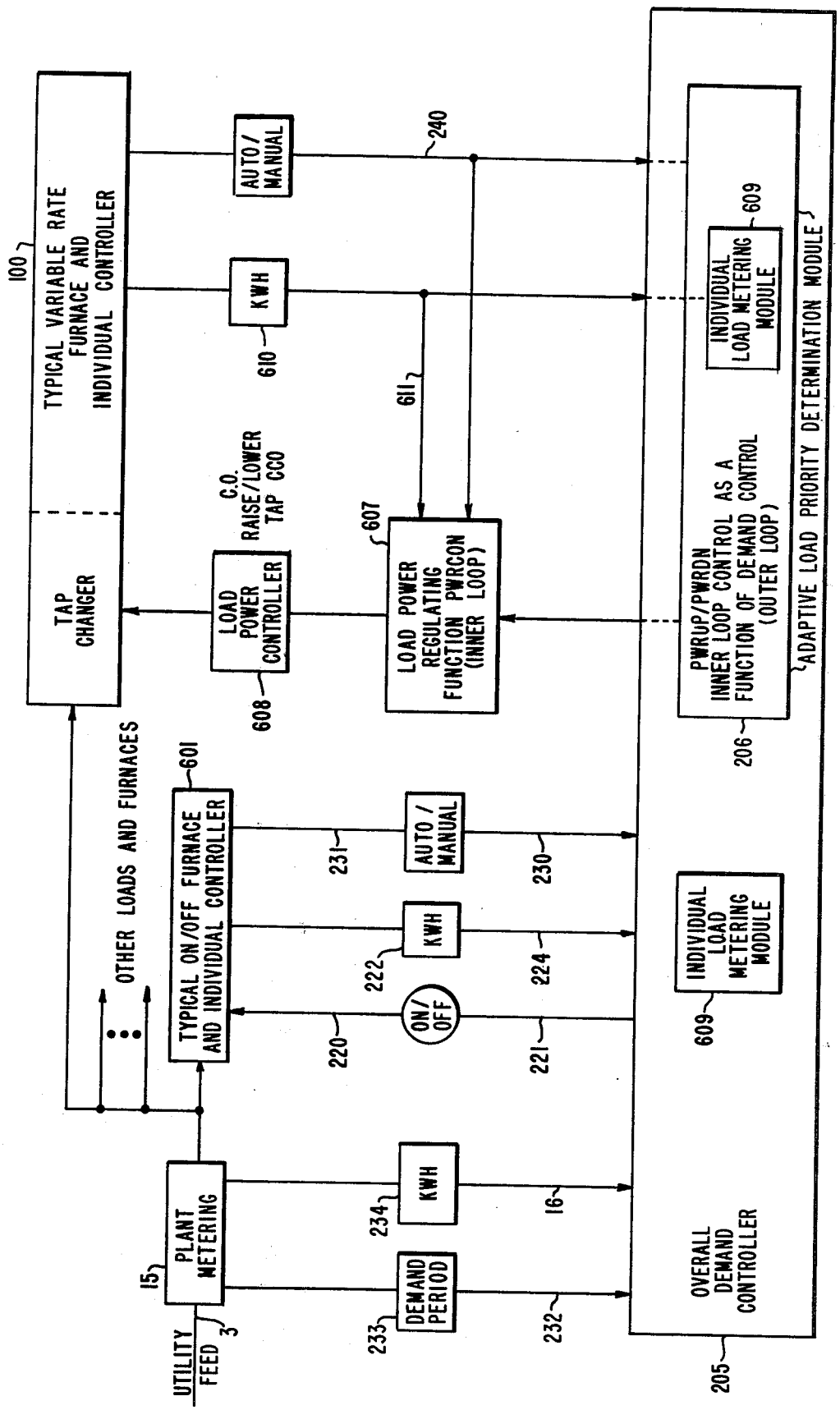
FIG. 5 is an overall view of a power demand control system including computer controlled adjustable loads according to the present invention.

The operation of the loops of FIG. 3 under the computer system CS will be better understood from a consideration of FIGS. 4 and 5 which, in block diagram, illustrate the method steps performed in accordance with the present invention in order to keep within the limit of an assigned demand the power consumption of a plant which includes loads that can be switched ON or OFF, as well as loads, such as furnace 100, which are adjustable to a regulated amount of power.

Referring to FIG. 4, the KWH meter (15) of the utility company provides on line 330 an indication of the energy consumed every time the wattmeter has completed one revolution. As explained hereabove by reference to FIG. 1, the slope of the tangent at the operative point (M) on the demand curve (OM) indicates the wattage. This slope is used for extrapolation up to the end of the 15 minute demand period. This extrapolation is performed by the demand prediction block 168. It estimates the segment NC supported by tangent MC. The error established by reference to the assigned demand limit is calculated by demand error block (79, 80) which is responsive to signals on lines 332, 333 from demand prediction block 168 and demand limit block 331, respectively. These blocks have been explained in the Putman patent.

Turning now to the right side of FIG. 4, load switching circuit 89 represents an array of individual switches such as (8, 9) in FIG. 2. A CO status circuit 340 informs via line 341 the adaptive load priority determination circuits 205 of the switching status of loads of the ON/OFF type. More specifically, priority selector circuit 82 is responsive to line 341. The load switching circuit 89 is controlled by ON/OFF load switching controller 342 which is affected to loads of the ON/OFF status type. The ON/OFF load switching controller 342 is gated by ON/OFF load switching gate circuit (102, 85) from line (86, 103), whenever switching of a particular load of the ON/OFF status type is permitted.

Selection of an ON/OFF load results from an affirmative decision in an error circulating loop comprising load switching gate circuit 102, residual error evaluation circuit 84, 95, line 108, residual error circuit 98, priority selector circuit 82 (as affected by the status of the contacts CO from line 341) and the effective successive earlier operations of the ON/OFF load switching controller 342 (as reflected by gate circuit 102, 85 via line 108 into priority selector circuit 82 in an ON/OFF load controlling loop). The error is recirculated in a loop comprising priority selector circuit 82, load selection circuit 83 (which is also part of the adaptive load priority determination circuits 205) and circuit (84, 95) which calculates TEMP=residual error±gain flow. This has been explained at length in the aforementioned Putman patent.

Besides ON/OFF types of loads, the plant facility here includes loads of the adjustable type, such as furnace 100 of FIG. 3. A residual error recirculation loop similar to the one for ON/OFF loads, is found for the adjustable loads. From priority selector 82 the amount of regulation is estimated by variable rate load reference controller 600 and, via 604 and 202, TEMP is calculated by circuit (95, 84). Variable rate load reference controller 600, which is included within block 205, operates as a function of the assigned demand limit in that, by line 601 the upper limit HISET or the lower limit LOSET of circuit 112 of FIG. 3 may be modified. For a given HISET and LOSET range, circuit 600 is responsive to the status of the adjustable loads given by load status circuit 602, via lines 603 and 614. As a result, variable rate load reference controller 600 seeks the available amount of power to be gained or taken away with an adjustable load. Such available amount is taken into consideration, via line 604, by the loop including residual error circuit 98. Circuit 600 also provides on line 606 the set point which is the amount of power to be obtained from the selected adjustable load. Therefore, on line 606 is the load power reference PSET. The load power regulator 607 operates on the load power controller 608 to actually raise, or lower, the tap CCO's. The effect on, or current state of, the load is translated via line 609 into load status circuit 602. The regulating loop comprises circuits 607, 608, line 609, individual load meter 610 and feedback line 611. This loop operates in conjunction with the load status from circuit 602 which appears on line 612, as one input to circuit 607. The system establishes a regulating error with the feedback on line 611 and the reference on line 606 from circuit 600. In contrast to the inner loop just described, the outer loop consists of the power demand controller which is closed through the plant KWH meter 15, 51 and in turn, via 168, 331, 78, 95, 98, and 205 to adjust the load power reference on 606 to the inner loop.

Having selected an ON/OFF load, the ON/OFF load controlling loop, as seen earlier, provides a corrected residual error TEMP in circuit 95, 84 which is recirculated in a loop closing through priority selector circuit 82 and load selection circuit 83. The decision to switch is by gate circuit (85, 102) and controller 342 with undating of selector 82 by 340, 341. In the same manner, an increased or decreased amount of power, to be drawn from an adjustable load found in priority selector circuit 82, leads to a tentative computation of corrected residual error TEMP in (95, 84). Regulation of power is by a loop closing on circuit 600 by 607 and 608.

As a result of a calculation, involving an ON/OFF load, the ON/OFF load switching gate circuit (85, 102) will either allow or not allow switching. The error circulating loop via line 108 on the residual error circuit 98, may in turn cause another scanning of the priority selector circuit 82 for another residual error iteration. Such residual error is based on the demand error derived on line 346 to priority selector circuit 82 The power gain, or loss due to the switching of a prospective ON/OFF load by 342 and 89, provides the residual error on line 350, thereby to cause a search for an available load by scanning through the priority selector circuit 82.

If it is an adjustable load which has been selected from the priority selector circuit 82, TEMP is calculated on the basis of the increase, or decrease, amount of power known from 600 and supplied on line 604. The residual error again is determined by circuit 98 in relation to effective regulation by circuit 608 and, if necessary, a further search for an available amount of regulated power will ensue by scanning through the priority selector circuit 82. Thus, if all the power the selected adjustable load can take is less than desired, the difference will be sought from another adjustable load, and so on. If it appears that (assuming an increase of power is required) when a load is initially at LOSET (lower limit) only a portion of the available power up to HISET (upper limit) may be needed, only that portion is asked for. If, on the other hand, the error is large, the tap changer may have to be raised to its maximum and some other load then increased partially. The same can be said when regulation is downward from HISET. Thus, if such maximum regulation is not sufficient to cancel the error, the residual error will necessitate a further adjustment upward, or downward, on another load. If, on required increase of power, such other load is already on HISET (upper limit), as seen from the load status circuit 602 and line 603, selection will shift to another load.

The demand error takes into account not only the prediction of the demand (168) at the time and the demand limit (331) assigned for the particular demand period but also the constraints which have been exercised in the meantime by the constraint exercising loop which is effective on the production and non-production loads having a constraint. As earlier explained, the constraints when exercised may cause a load to be inhibited from switching, for instance if a furnace has reached the end of the heat, or become available for switching if for instance a furnace out of production has become available to start heat. After a demand error has been determined on line 346, and before any calculation of the residual error by block 98, the constraints are exercised via line 72 onto the load constraint setting circuit 352. Block 352 establishes the preset constraints for the loads of the controllable type, e.g. onto controller 342. The load switching circuit 89 will effect switching of the selected controllable loads and assume the constraints of the non-controllable loads, accordingly.

The adaptive load priority determination circuit 205 of FIG. 4 is common to all adjustable loads, e.g., regulated arc furnaces. This block appears with the following signal carrying lines: 350 from residual error circuit 98 into priority selector 82; 603, 614 and 613 from load status circuit 602 into priority selector circuit 82; 614 from load status circuit 602 into variable rate load reference control circuit 600; 640 from assigned demand limit circuit 331 into variable rate load reference controller 600 in order to change HISET and LOSET as a function of demand limit; 606 from the variable rate load reference controller 600 into load power regulator 607; 604 from the variable rate load reference controller 600 into the TEMP calculating circuit (84, 95) and 201 from the demand error circuit (79, 80) into priority selector 82.

Circuit 205 is also common to the ON/OFF loads, and certain earlier mentioned circuits are used in the adaptive load priority determination of an ON/OFF load as well. For instance, priority selector circuit 82 is responsive to afore-mentioned line 201, and also to line 345 from the ON/OFF load switching controller 342, as well as to line 341 from CO STATUS circuit 340. Instead of the variable load reference controller 600, load selection circuit 83 is used to control (via line 202) the TEMP calculating circuit (95,84). While decisions for an adjustable load to increase or decrease power are performed through the outer loop by lines 606, 623, and through the inner loop by circuits 607, 608 and 610, decisions for an ON/OFF load to shed or reconnect the load are performed through ON/OFF load switching gate circuit 85, ON/OFF load switching controller 342 and load switching circuit 89, with CO STATUS circuit 340, as earlier described in the Putman patent.

Referring to FIG. 5, the adaptive load priority determination circuit 205 is represented with its interface with the industrial plant under power demand control. Energy is received on power line 3 by the plant which typically includes loads and furnaces. At 601 is shown a furnace of the ON/OFF type with its individual controller, and at 100 a furnace of the adjustable load type including a tap changer. The KWH meter of the company (15) is used at 233 to provide a signal indicative of the demand period (say, 15 minutes). Meter 15 also provides the KWH indication at 234. Each furnace has its individual meter (for instance, 222 for furnace 601 and 610 for furnace 100). Furnace 100 is shown, by analogy with FIG. 4, with its inner loop 610, 611, 607 and 608. A KWH pulse provides the KWH signal to an individual load metering module (609) within the system 205. Considering more particularly furnace 100, a number of signals are applied to the adaptive load priority determination module 206 within system 205. Module 206 can more readily be identified by reference to FIG. 6 in which the decision making process to add power (PWRUP) or to reduce power (PWRDN) via line 606 (or line 113 on FIG. 3) onto load power regulator 607 (or transfer function 112 on FIG. 3) is diagrammatically represented.

Figure 6:
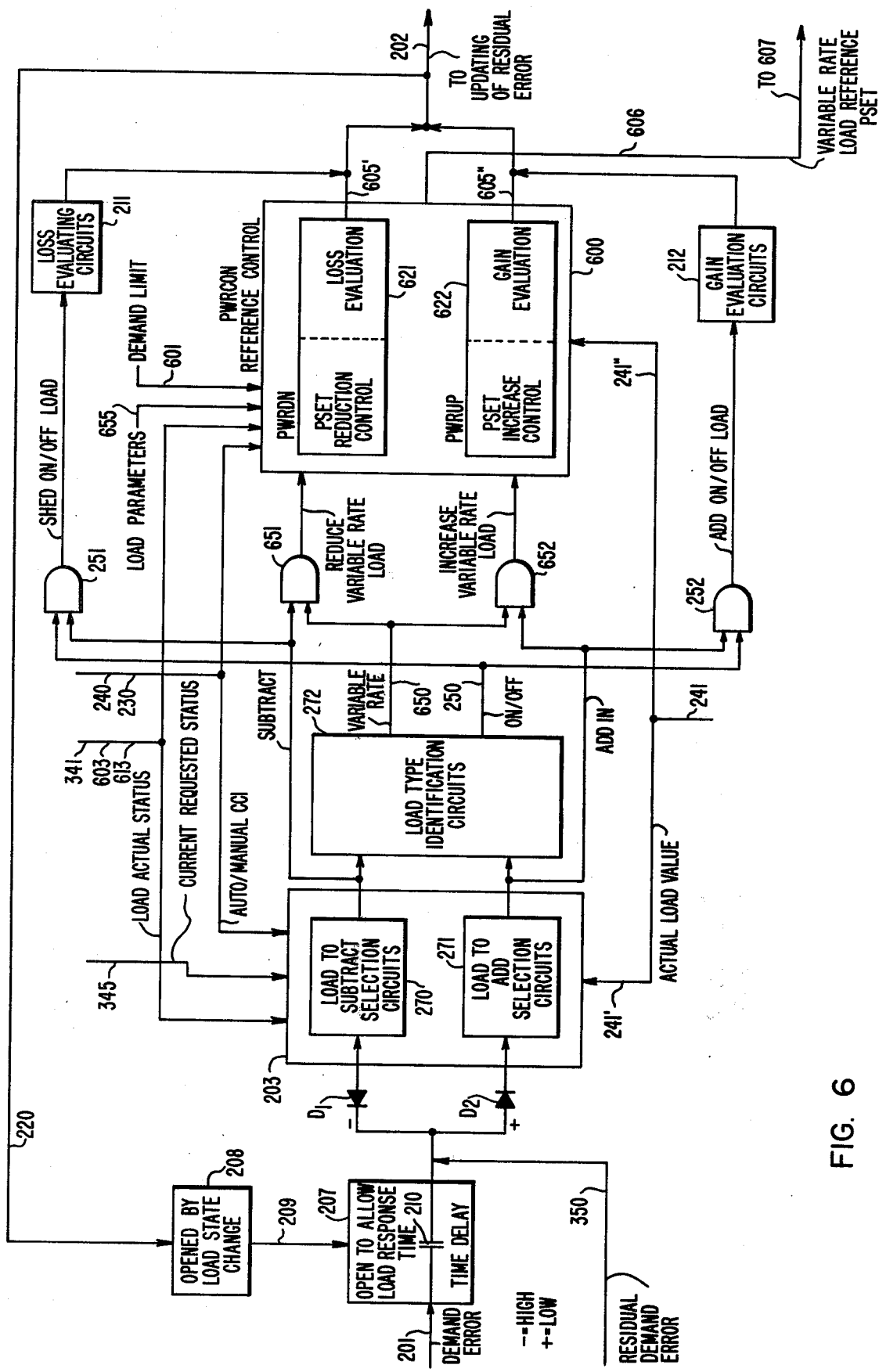
FIG. 6 is a diagram completing the diagram of FIG. 4 by expanding the block 205 in more detail.

FIG. 6 should be considered together with FIGS. 4 and 5 since it shows in detail the particular internal arrangement of the adaptive load priority determination module 206 which is itself a main part of the circuits 205 of FIG. 4. On line 201 from circuit (79, 80) of FIG. 4 the demand error is fed to one of two channels, depending upon whether the error is positive or negative, e.g., whether corrective control requires to subtract power (too high consumption) or add power (too low consumption). Such signal of line 201 is passed through a time delay circuit 207 in the form of a path opened for a definite time after a corrective load state change (see circuit 208 gating via line 209 the state of contacts 210; 208 has a definite active time). At the entrance of the two channels via line 350, the residual demand error loop closes as earlier explained in relation to FIG. 4. Diodes $D_1$, $D_2$ are used to select one channel or the other, depending upon the polarity applied to the diodes. Each channel can be read on FIG. 6 in terms of the diagram of FIG. 4. The negative channel includes a circuit 270 for the selection of loads to subtract, whereas the positive channel includes a circuit 271 for the selection of loads to be added. Circuits 270 and 271 together form a circuit 203 equivalent to the priority selector circuit 82, the load selection circuit for the ON/OFF loads and 83 of FIG. 4. Channel selection is in accordance with the sign of the error on line 350. Load selection in circuit 203 and in relation to circuit 82 is in accordance with actual load status on line 603, 613 (adjustable load) or 341 (ON/OFF load). It also depends upon the requested status (line 345), e.g., ON, OFF, RAISE, LOWER. The automatic or manual status of the load (AUTO/MANUAL CCI on line 240) also affects the priority list and affixed order in circuit 82. Load adjustment may use a power value which depends on the actual constant power level in the regulatory loop. Therefore, on lines 241, 241' is supplied to circuit 203 the actual load value.

Having selected with circuit 203 a load to provide correction by ON/OFF switching or by power regulation, circuit 272 determines two possible lines of load treatment. One is for the ON/OFF type of load on line 250; the other is on line 650 for the adjustable loads. These lines break down into positive and negative channels by gates 251 (to shed) and 252 (to add) for line 250, and by gates 651 (to reduce variable rate loads) and 652 (to increase variable rate loads) for line 650. Circuits 211 and 212 are the loss and gain evaluating circuits for selected ON/OFF loads, while 621, 622 are the loss and gain evaluating circuits for adjustable loads. The respective channels are selected by gates 251, 252, 651, 652. Logical treatment of an adjustable load involves within a power reference control circuit 600 the fixation of an amount PSET of power for reduction in association with loss evaluation (621) or of an amount PSET of power for increase in association with gain evaluation (622).

The estimation of PSET depends upon the demand limit, since by line 601 the assigned demand limit modifies HISET and LOSET (FIG. 4). It also depends upon the tap changer parameter provided via line 655.

In this respect, it is observed that the furnaces with tap changers are affected by two influences:

1. The demand control part of the system. This part will adjust PREF between HISET and LOSET. In general, in a demand limiting situation, the higher priority units will have a PSET at HISET, the lower priority units will have a PSET at LOSET, and for one intermediate priority the particular furnace will have PSET fluctuating (to adjust demand) between HISET and LOSET. Changes in PREF are not made unless PERR (see 2 below) is within the deadband and unless the furnace wait time has expired. Changes in PREF may be made in fixed predetermined amounts or percentages (stored within the controller) or in as large an amount as the error will allow, subject to the HISET AND LOSET constraints.

2. The KW regulator part of the system. This part controls the tap raise and lower CCO's in accordance with PERR (PERR=PSET−PFBK, where PFBK is the actual load KW), PDBND (the deadband in KW which PERR must exceed in absolute value before the tap raise or lower CCO's are energized), and the furnace KW regulator wait time. Once a tap raise or lower CCO request is made, the system will wait the wait time before making the next raise or lower CCO request on that furnace.

In cases where the demand limit is frequently changed (perhaps remotely by CCI, or automatically by time of day), recognition must be made of the fact that the HISET and LOSET values are automatically changed also (PREF will be eventually by the demand control algorithm). Therefore:

1. The sum of all the HISETs plus the ON/OFF loads plus the base load is the maximum achievable demand (assuming the computer is controlling all the loads).

2. The sum of all the LOSETs plus the base load is the minimum achievable demand (again assuming all loads are computer controlled).

Typical values appear below. Furnaces 12, 13, and 14 are ON/OFF units; 4, 6, 9, 15 and 16 are variable rate units. Typical parameters are as follows:

| Demand Limit (remotely selected by PB): | | |
|---|---|---|
| HIGH | 185 MW | |
| MEDIUM | 135 MW | |
| LOW | 90 MW | |

| FURN | NOMINAL | HISET | INITIAL PSET | LOSET | PDBND | PSET CHANGE %/100 | WAIT TIME |
|---|---|---|---|---|---|---|---|
| 4 | 14 MW | 10 MW | 9 MW | 6 MW | .3 MW | .16 | 180 SEC |
| 6 | 14 | 10 | 9 | 6 | .3 | .16 | 180 |
| 9 | 13 | 9 | 8 | 5 | .3 | .18 | 180 |
| 15 | 42 | 37 | 35 | 26 | 1.0 | .08 | 180 |
| 16 | 42 | 37 | 35 | 26 | 1.0 | .08 | 180 |
| 12 | 14.5 | 14.5 | | OFF | | | |
| 13 | 13.5 | 13.5 | | OFF | | | |
| 14 | 12 | 12 | | OFF | | | |
| | 165 MW | 143 MW | | 69 MW | | | |
| BASE | 20 | 20 | | 20 | | | |
| | 185 MW | 163 MW | | 89 MW | | | |

PSET may be established only if the load is under automatic regulation. Therefore, the logic of line 230, 240 is inputted in circuit 600. PSET also depends upon the load actual status and the load actual value (lines 341, 603 and 241).

The gain or loss evaluating circuits 621, 622 lead to updating of the residual error by line 202, and the calculation of PSET leads to adjustment of the set point in the KWH control loop of the furnace, by line 606 to the load power regulator 607.

For the adjustable loads, the interface IF with the instrumentation and apparatus controlled in the plant has been shown in FIG. 3 by computer. As shown in FIG. 5, the plant includes, typically, furnaces of the ON/OFF type, such as 601, and furnaces of the regulated type, such as 100, the latter with an associated meter 610. The main meter is at 15 from the utility power company feeder. From each meter go to the pulse inputs PI of the control system pulses due to closing of the demand period start interrupt (of the main meter 15) and to the KW pulse interrupts of the meters (main and individual). In the opposite direction, namely from the computerized control system, the CCO (contact closure output) indicates to the furnace control circuit whether the furnace is ON or OFF or whether the furnace is at HISET or LOSET.

On the basis of the explanation given, the operation of the control system according to the invention may be described as follows:

The computerized control system basically controls each furnace by opening or closing contacts in such as way as to try to limit the average plant power consumption over a fixed period (the 'Demand Period'—usually 15 min.) to be close to but less than a preset value (the 'Demand Limit KW'). In deciding when to manipulate the contacts and which ones to manipulate, the computerized system refers to the various rules and conditions stored internally.

The control algorithm typically operates as follows:

The demand pulse from the plant KWH meter 15 resets the computer demand period timer (internal timing of the period is from the computer real-time clock). KWH pulses from the plant KWH meter are received by the controller as interrupts (or frequently scanned status contact inputs) which represent KWH consumed and these interrupts initiate the calculation of the total KWH in the period in relation to the elapsed time of the period. From this data an actual point on the demand curve (FIG. 1) is determined, and the actual slope of the curve is determined using a weighted average of the last three pulse periods (last four pulses). Actual slope is used to predict final demand at end of the period. Depending on the demand prediction, time into period, and values of various furnace constraints and control parameters, the computer system may open or close the furnace power on permissive contacts to force the end of period demand toward the demand limit. The time at which the set point of a load is actually changed or a load is added, or shed, is determined and controlled in consideration of the incremental demand impact that particular load will have on the remaining portion of the period and on the response time of the load, e.g., the time it takes for the load to change its power usage. The operation of the algorithm is shown graphically in FIGS. 8A-8F considered hereinafter. The detailed action the computer takes is dependent on how much of the demand period has expired.

Typically three regions of fields of control are provided during the 15 minute period. These fields go from "very permissive" to less permissive, and the last allows for full, conservative control when close to the end of the period.

The system automatically extrapolates the kilowatt hour meter pulses at the end of a demand period to apportion the energy between that period and the next period.

The control system calculates how much to add or subtract and when to shed, or add, loads based on the actual current value of the load itself which is remembered within the system. At each kilowatt hour pulse, the value in the system of that load is updated as a function of the actual load being drawn. That load is determined as a weighted average of the last three pulse periods. The nameplate rating, as defined by the customer, is inserted into the table of load values, unless LOSET or HISET are being used which are the ceilings for regulated loads on the actual current KW value calculated by the system. Should the actual current KW value calculated drop below a predetermined value, that load in such instance is considered as having been externally turned off.

SIMULATED SYSTEM OPERATION

The following several pages represent simulated system operation (using the software simulator). A 15 minute demand period was used, with the 3 intervals at roughly 5 minutes each. The tap changers had no external delay time and the tap changer KW regulators had 20 seconds wait time. Tap changer speeds were on the order of 20 KW/sec for the smaller furnaces (12-15MW) and 30 KW/sec for the larger ones.

On the following pages, the prompt character '?' replaces the sequence

'ENTER PASSWORD SU'

'ENTER CODE LETTER'

Other test data is as follows:

| FN | LN | NOM MW | HI SET | P SET | LO SET | OBND MW | PSET % CH |
|---|---|---|---|---|---|---|---|
| 4 | 1 | 14 | 10 | 9 | 8 | .3 | 16 |
| 6 | 2 | 14 | 10 | 9 | 8 | .3 | 16 |
| 9 | 3 | 13 | 9 | 8 | 7 | .3 | 18 |
| 15 | 4 | 30 | 30 | 27 | 24 | .6 | 6 |
| 16 | 5 | 30 | 30 | 27 | 24 | .6 | 6 |
| 12 | 6 | 14.5 | N/A | N/A | N/A | N/A | N/A |
| 13 | 7 | 13.5 | N/A | N/A | N/A | N/A | N/A |
| 14 | 8 | 12 | N/A | N/A | N/A | N/A | N/A |

A base load of 100MW was included in the simulation. Other scaling was such that a furnace pulse came in every 8 sec or so and a plant KWH pulse every 12 sec or so.

Load priority was from 8 (Lowest) up to 1 (Highest) in the order of the above list.

```
TABLE 1

POWER FAIL ON   4- 9 AT 10:16
 DEMAND PERIOD ENDING   4/ 9 10:16:59  (W)2515 CONTROLLER ON    AU
    LIMIT=185000. KW   ACTUAL=261248. KW   LOADFACTOR=141.2 %
    ENERGY USED= 65312.KWH   (W)2515 CONTROLLED=     0.KWH
 RKVA LIMIT=     0. KVAR       ACTUAL=     0. KVAR
  FURN   KWH USED
    4       60.
    6       60.
    9       60.
   15      240.
   16      240.
   12      140.
   13      120.
   14      100.
   91        0.
   92        0.
   93        0.
   94        0.

56 S   3 3 3 3      3 3 3 2 2     2 2
 ***** DEMAND LIMIT EXCEEDED ***********************
```

TABLE 2
CURRENT POWER RATE 213158.KWH/H  PERIOD LENGTH   31 SEC
ON      4 5     6       7       8
OFF   316 S     6       7       8
? C

| FN | LN | HISET  | PSET  | LOSET | PDBND | PERR  | PUPSETCH | PFBK   |
|----|----|--------|-------|-------|-------|-------|----------|--------|
| 4  | 1  | 10000. | 8000. | 8000. | 300.  | 88.   | 0.160    | 7912.  |
| 6  | 2  | 10000. | 8000. | 8000. | 300.  | 174.  | 0.160    | 7826.  |
| 9  | 3  | 9000.  | 7000. | 7000. | 300.  | -200. | 0.130    | 7200.  |
| 15 | 4  | 30000. | 24000.| 24000.| 600.  | 0.    | 0.060    | 24000. |
| 16 | 5  | 30000. | 24000.| 24000.| 600.  | -545. | 0.060    | 24545. |

? E
DNTAP   711 S     5
UPTAP   749 S     3
DNTAP   777 S     3

TABLE 3
 COMPUTER GENERATED DEMAND PULSE 
  DEMAND PERIOD ENDING  4/ 9 10:31:59 (W)2515 CONTROLLER ON   AU
    LIMIT=185000. KW   ACTUAL=185991. KW   LOADFACTOR=100.5 %
    ENERGY USED= 46498.KWH   (W)2515 CONTROLLED=   6489.KWH
PKVA LIMIT=      0. KVAR        ACTUAL=     0. KVAR

| FURN | KWH USED |
|------|----------|
| 4    | 1980.    |
| 6    | 1960.    |
| 9    | 1780.    |
| 15   | 6000.    |
| 16   | 6060.    |
| 12   | 1280.    |
| 13   | 1200.    |
| 14   | 1060.    |
| 91   | 0.       |
| 92   | 0.       |
| 93   | 0.       |
| 94   | 0.       |

60 S  3 3 3 3 3    2 2 2 2 2     2 2
*** DEMAND LIMIT EXCEEDED *******************

TABLE 4
UPREF    79 S     1
UPTAP    79 S     1
UPREF   145 S     1      2
UPTAP   154 S     1      2
UPTAP   220 S     5
UPREF   229 S     2
UPTAP   229 S     3
UPTAP   238 S     2
DNTAP   256 S     3
UPREF   284 S     3
UPTAP   293 S     3
UPTAP   312 S     4
DNTAP   330 S     4
UPTAP   330 S     2
DNTAP   348 S     2
UPREF   394 S     3      4
UPTAP   403 S     3      4
UPREF   453 S     4
UPREF   512 S     4
UPTAP   520 S     4
UPREF   565 S     4      5
UPTAP   574 S     5
UPTAP   592 S     3

TABLE 4 CONT.

```
DNTAP   609 S      3
UPREF   627 S      5
UPREF   653 S      5
ON      705 S      6
UPREF   705 S      5
UPTAP   705 S      2
UPTAP   713 S      3
ON      800 S      7
OFF     815 S      7
ON      836 S      7
```

TABLE 5

COMPUTER GENERATED DEMAND PULSE 
 DEMAND PERIOD ENDING  4/ 9 10:46:59  (W)2515 CONTROLLER ON    AU
     LIMIT=185000. KW   ACTUAL=184777. KW   LOADFACTOR= 99.9 %
     ENERGY USED= 46194.KWH   (W)2515 CONTROLLED= -3383.KWH
PKVA LIMIT=        0. KVAR         ACTUAL=        0. KVAR

| FURN | KWH USED |
|---|---|
| 4 | 2460. |
| 6 | 2380. |
| 9 | 2060. |
| 15 | 6660. |
| 16 | 6420. |
| 12 | 800. |
| 13 | 300. |
| 14 | 0. |
| 91 | 0. |
| 92 | 0. |
| 93 | 0. |

```
UPTAP    5 S      1
DNTAP   65 S      1
UPTAP   65 S      2
DNTAP   72 S      2
? C
```

TABLE 6

| FN | LN | HISET | PSET | LOSET | PDBND | PERR | PUPSETCH | PFBK |
|---|---|---|---|---|---|---|---|---|
| 4 | 1 | 10000. | 10000. | 8000. | 300. | 270. | 0.160 | 9730. |
| 6 | 2 | 10000. | 10000. | 8000. | 300. | 137. | 0.160 | 9863. |
| 9 | 3 | 9000. | 9000. | 7000. | 300. | -114. | 0.180 | 9114. |
| 15 | 4 | 30000. | 30000. | 24000. | 600. | 0. | 0.060 | 30000. |
| 16 | 5 | 30000. | 30000. | 24000. | 600. | 0. | 0.060 | 30000. |

? E
? G

TABLE 7

FURNACE STATUS LOG   4/ 9 10:51:24

| FURN | AU/MA | ON/OFF | CURR KW |
|---|---|---|---|
| 4 | AU | ON | 9730. |
| 6 | AU | ON | 9863. |
| 9 | AU | ON | 9114. |
| 15 | AU | ON | 30000. |
| 16 | AU | ON | 30000. |
| 12 | AU | ON | 14500. |
| 13 | AU | ON | 13500. |
| 14 | AU | OF | 0. |
| 91 | AU | OF | 0. |
| 92 | AU | OF | 0. |
| 93 | AU | OF | 0. |
| 94 | AU | OF | 0. |

? E

TABLE 8
```
OFF    316 S      6       7
DNREF  316 S      5
DNTAP  316 S      5
UPTAP  316 S      1
DNREF  385 S      5
DNTAP  394 S      5
UPTAP  428 S      2
DNREF  437 S      5
DNREF  489 S      4       5
DNTAP  498 S      4
DNREF  560 S      4
DNTAP  569 S      4
DNREF  614 S      4
? C
```

TABLE 9

| FN | LN | HISET  | PSET   | LOSET | PDBND | PERR  | PUPSETCH | PFBK   |
|----|----|--------|--------|-------|-------|-------|----------|--------|
| 4  | 1  | 10000. | 10000. | 8000. | 300.  | -141. | 0.160    | 10141. |
| 6  | 2  | 10000. | 10000. | 8000. | 300.  | -141. | 0.160    | 10141. |
| 9  | 3  | 9000.  | 9000.  | 7000. | 300.  | -115. | 0.180    | 9115.  |
| 15 | 4  | 30000. | 24918. | 24000.| 600.  | -528. | 0.060    | 25445. |
| 16 | 5  | 30000. | 24000. | 24000.| 600.  | 0.    | 0.060    | 24000. |

```
? E
DNREF  668 S      3       4
DNTAP  668 S      3
? C
```

TABLE 10

| FN | LN | HISET  | PSET   | LOSET | PDBND | PERR   | PUPSETCH | PFBK   |
|----|----|--------|--------|-------|-------|--------|----------|--------|
| 4  | 1  | 10000. | 10000. | 8000. | 300.  | -141.  | 0.160    | 10141. |
| 6  | 2  | 10000. | 10000. | 8000. | 300.  | -141.  | 0.160    | 10141. |
| 9  | 3  | 9000.  | 7380.  | 7000. | 300.  | -1112. | 0.180    | 8492.  |
| 15 | 4  | 30000. | 24000. | 24000.| 600.  | 467.   | 0.060    | 23533. |
| 16 | 5  | 30000. | 24000. | 24000.| 600.  | 40.    | 0.060    | 23960. |

? E

TABLE 11
```
DNREF  760 S      2       3
DNTAP  769 S      2
UPTAP  769 S      1       4
DNTAP  787 S      1
DNREF  834 S      1       2
```

TABLE 12
```
 COMPUTER GENERATED DEMAND PULSE 
 DEMAND PERIOD ENDING  4/ 9 11: 1:59 (W)2515 CONTROLLER ON    AU
    LIMIT=185000. KW   ACTUAL=193951. KW   LOADFACTOR=104.8 %
    ENERGY USED= 48488.KWH   (W)2515 CONTROLLED=  6154.KWH
RKVA LIMIT=     0. KVAR        ACTUAL=     0. KVAR
FURN   KWH USED
  4       2480.
  6       2440.
  9       2180.
 15       7080.
 16       6720.
 12       1300.
 13       1200.
 14          0.
 91          0.
 92          0.
 93          0.
 94          0.

60 S   3 3 3 3 3    2 2 2 2    2 2
***** DEMAND LIMIT EXCEEDED *********************
```

TABLE 13
CURRENT POWER RATE 172340.KWH/H  PERIOD LENGTH   900 SEC
```
UPTAP    47 S    3
UPREF    84 S    1
DNTAP    84 S    3
UPTAP    84 S    1
? N
ENTER NEW TIME (SECONDS) 60
TIME WAS  315 IS    60
? C
FN LN    HISET     PSET    LOSET    PDBND   PERR    PUPSETCH  PFBK
 4  1   10000.    9744.   8000.    300.    159.     0.160    9585.
 6  2   10000.    9280.   8000.    300.    174.     0.160    7826.
 9  3    9000.    7000.   7000.    300.    201.     0.180    6799.
15  4   30000.   24000.  24000.    600.   -245.     0.060   24245.
16  5   30000.   24000.  24000.    600.   2195.     0.060   21805.
? E
UPREF   141 S    1    2
UPTAP   141 S    2    5
DNTAP   137 S    5
? C
FN LN    HISET     PSET    LOSET    PDBND   PERR    PUPSETCH  PFBK
 4  1   10000.   10000.   8000.    300.   -141.     0.160   10141.
 6  2   10000.    9280.   8000.    300.     73.     0.160    9207.
 9  3    9000.    8260.   7000.    300.    143.     0.180    6857.
15  4   30000.   24000.  24000.    600.    -27.     0.060   24027.
16  5   30000.   24000.  24000.    600.    744.     0.060   23256.
? E
UPREF   225 S    2    3
UPTAP   225 S    3
UPREF   293 S    3    4
UPTAP   307 S    4
UPTAP   335 S    2
UPREF   353 S    4
DNTAP   362 S    2
UPTAP   362 S    4
UPREF   407 S    4
UPREF   460 S    4    5
UPTAP   469 S    5
? C
```

TABLE 14
```
FN LN    HISET     PSET    LOSET    PDBND   PERR    PUPSETCH  PFBK
 4  1   10000.   10000.   8000.    300.   -141.     0.160   10141.
 6  2   10000.   10000.   8000.    300.    137.     0.160    9863.
 9  3    9000.    9000.   7000.    300.   -231.     0.180    9231.
15  4   30000.   30000.  24000.    600.      0.     0.060   30000.
16  5   30000.   26966.  24000.    600.    -35.     0.060   27001.
? E
UPREF   565 S    5
UPTAP   565 S    5
UPREF   617 S    5
ON      723 S    6
OFF     744 S    6
ON      761 S    6
ON      895 S    7
```

TABLE 15

```
 COMPUTER GENERATED DEMAND PULSE 
  DEMAND PERIOD ENDING   4/ 9 11:16:59 (W)2515 CONTROLLER ON   AU
     LIMIT=185000. KW   ACTUAL=184660. KW   LOADFACTOR= 99.8 %
     ENERGY USED= 46165.KWH   (W)2515 CONTROLLED= -3243.KWH
RKVA LIMIT=       0. KVAR         ACTUAL=      0. KVAR
FURN   KWH USED
  4       2480.
  6       2360.
  9       2120.
 15       6900.
 16       6600.
 12        660.
 13         20.
 14          0.
 91          0.
 92          0.
 93          0.
 94          0.
OFF    64 S       6       7
DNREF  64 S       5
DNTAP  72 S       5
UPTAP  89 S       1
DNTAP 115 S       1
DNREF 141 S       5
DNTAP 149 S       5
DNREF 192 S       5
DNREF 245 S       3       5
DNTAP 254 S       3
DNREF 271 S       4
DNTAP 280 S       4
UPREF 352 S       3
UPTAP 361 S       3
UPREF 433 S       3
UPREF 442 S       4
UPTAP 442 S       5
UPTAP 451 S       4
DNREF 504 S       4
DNTAP 513 S       4
DNREF 633 S       4
DNTAP 647 S       4
UPREF 764 S       5
UPREF 773 S       4
UPTAP 773 S       5
UPTAP 782 S       4
UPREF 844 S       5
UPTAP 853 S       1       5

** COMPUTER GENERATED DEMAND PULSE **
  DEMAND PERIOD ENDING   4/ 9 11:31:59 (W)2515 CONTROLLER ON   AU
     LIMIT=185000. KW   ACTUAL=184992. KW   LOADFACTOR=100.0 %
     ENERGY USED= 46248.KWH   (W)2515 CONTROLLED=  8105.KWH
RKVA LIMIT=       0. KVAR         ACTUAL=      0. KVAR
FURN   KWH USED
  4       2480.
  6       2480.
  9       2200.
 15       7140.
 16       6360.
 12        260.
 13        240.
 14          0.
 91          0.
```

TABLE 15 CONT.

```
  92        0.
  93        0.
  94        0.
DNTAP    15 S    1
UPTAP   191 S    1
UPTAP   261 S    3
DNTAP   279 S    3
UPTAP   314 S    2
? Z
DR1,2382,175000.
 2382=  0.1750000E 06
DNTAP   340 S    2
DNREF   367 S    5
DNTAP   367 S    5
DNREF   411 S    4        5
DNTAP   420 S    4
UPTAP   420 S    3
UPTAP   429 S    2
? C
```

TABLE 16

| FN | LN | HISET | PSET | LOSET | PDBND | PERR | PUPSETCH | PFBK |
|---|---|---|---|---|---|---|---|---|
| 4 | 1 | 13000. | 10000. | 8000. | 300. | -141. | 0.160 | 10141. |
| 6 | 2 | 10000. | 10000. | 8000. | 300. | -299. | 0.160 | 10299. |
| 9 | 3 | 9000. | 9000. | 7000. | 300. | -114. | 0.180 | 9114. |
| 15 | 4 | 30000. | 24738. | 24000. | 600. | -60. | 0.060 | 26377. |
| 16 | 5 | 30000. | 24000. | 24000. | 600. | 261. | 0.060 | 23739. |

```
? E
DNTAP   455 S    2
DNREF   491 S    4
DNREF   519 S    3        4
DNTAP   528 S    3
DNREF   611 S    2        3
DNTAP   620 S    2
DNREF   685 S    1        2
DNTAP   694 S    1
DNREF   779 S    1
DNTAP   789 S    1
? C
```

TABLE 17

| FN | LN | HISET | PSET | LOSET | PDBND | PERR | PUPSETCH | PFBK |
|---|---|---|---|---|---|---|---|---|
| 4 | 1 | 10000. | 8000. | 8000. | 300. | -109. | 0.160 | 8109. |
| 6 | 2 | 10000. | 8000. | 8000. | 300. | 174. | 0.160 | 7826. |
| 9 | 3 | 9000. | 7000. | 7000. | 300. | 77. | 0.180 | 6923. |
| 15 | 4 | 30000. | 24000. | 24000. | 600. | 264. | 0.060 | 23736. |
| 16 | 5 | 30000. | 24000. | 24000. | 600. | 264. | 0.060 | 23736. |

```
 COMPUTER GENERATED DEMAND PULSE 
  DEMAND PERIOD ENDING  4/ 9 11:46:59 (W)2515 CONTROLLER ON    AU
    LIMIT=175000. KW   ACTUAL=178951. KW   LOADFACTOR=102.3 %
    ENERGY USED= 44738.KWH   (W)2515 CONTROLLED=  1388.KWH
RKVA LIMIT=     0. KVAR        ACTUAL=     0. KVAR
FURN  KWH USED
  4    2440.
  6    2340.
  9    2060.
 15    6540.
 16    6300.
 12       0.
 13       0.
 14       0.
```

TABLE 17 CONT.
```
91        0.
92        0.
93        0.
94        0.

60 S  3 3 3 3 3    2 2 2 2 2    2 2
***** DEMAND LIMIT EXCEEDED ********************
```

TABLE 18

```
CURRENT POWER RATE 170526.KWH/H  PERIOD LENGTH   900 SEC
UPREF    82 S    1
UPTAP    82 S    1
UPREF   138 S    1       2
UPTAP   143 S    1       2
UPREF   222 S    2
UPTAP   232 S    2
UPREF   250 S    3
UPTAP   259 S    3
UPTAP   278 S    5
UPTAP   296 S    2
DNREF   314 S    3
DNTAP   323 S    3
UPTAP   333 S    1
DNTAP   342 S    2
DNTAP   360 S    1
UPTAP   452 S    4
? C
FN LN   HISET    PSET    LOSET    PDBND    PERR    PUPSETCH  PFBK
 4  1  10000.  10000.   8000.    300.     137.     0.160    9863.
 6  2  10000.  10000.   8000.    300.     137.     0.160    9863.
 9  3   9000.   7000.   7000.    300.      77.     0.180    6923.
15  4  30000.  24000.  24000.    600.    -545.     0.060   24545.
16  5  30000.  24000.  24000.    600.    -270.     0.060   24270.
? E
UPTAP   562 S    2
DNREF   654 S    2
DNTAP   663 S    2
UPREF   747 S    2
UPTAP   756 S    2
UPTAP   821 S    5
UPREF   830 S    2       3
DNTAP   839 S    5
UPTAP   839 S    3
** COMPUTER GENERATED DEMAND PULSE **
  DEMAND PERIOD ENDING  4/ 9 12: 1:59 (W)2515 CONTROLLER ON    AU
     LIMIT=175000. KW   ACTUAL=174869. KW   LOADFACTOR= 99.9 %
      ENERGY USED= 43717.KWH   (W)2515 CONTROLLED=  -860.KWH
RKVA LIMIT=    0. KVAR         ACTUAL=     0. KVAR
FURN  KWH USED
  4      2420.
  6      2340.
  9      1780.
 15      6000.
 16      6000.
 12         0.
 13         0.
 14         0.
 91         0.
 92         0.
 93         0.
 94         0.
UPTAP     5 S    4
? C
```

TABLE 19

| FN | LN | HISET | PSET | LOSET | PDBND | PERR | PUPSETCH | PFBK |
|---|---|---|---|---|---|---|---|---|
| 4 | 1 | 10000. | 10000. | 8000. | 300. | -13. | 0.160 | 10013. |
| 6 | 2 | 10000. | 10000. | 8000. | 300. | -128. | 0.160 | 10128. |
| 9 | 3 | 9000. | 7380. | 7000. | 300. | -1412. | 0.180 | 8792. |
| 15 | 4 | 30000. | 24000. | 24000. | 600. | -2207. | 0.060 | 26207. |
| 16 | 5 | 30000. | 24000. | 24000. | 600. | 228. | 0.060 | 23772. |

? E
```
DNREF    68 S       3        4
DNTAP    68 S       3        4
? Z
DRM,2382,25!RM,2382,215000.
  2382=  0.2150000E 06
DNREF   150 S       3
UPREF   178 S       3
UPTAP   187 S       3
UPREF   243 S       3        4
UPTAP   252 S       4
UPREF   297 S       4
UPREF   351 S       4
UPTAP   369 S       3
DNTAP   387 S       3
UPREF   405 S       4        5
UPTAP   414 S       5
UPREF   458 S       5
UPTAP   501 S       2
UPREF   519 S       5
DNTAP   527 S       2
ON      570 S       6        7        8
UPREF   570 S       5
UPTAP   585 S       3
? C
```

| FN | LN | HISET | PSET | LOSET | PDBND | PERR | PUPSETCH | PFBK |
|---|---|---|---|---|---|---|---|---|
| 4 | 1 | 10000. | 10000. | 8000. | 300. | -139. | 0.160 | 10139. |
| 6 | 2 | 10000. | 10000. | 8000. | 300. | 139. | 0.160 | 9861. |
| 9 | 3 | 9000. | 9000. | 7000. | 300. | -114. | 0.180 | 9114. |
| 15 | 4 | 30000. | 30000. | 24000. | 600. | 0. | 0.060 | 30000. |

? Q

FURNACE STATUS LOG    4/ 9 12:12:44

| FURN | AU/MA | ON/OFF | CURR KW |
|---|---|---|---|
| 4 | AU | ON | 10141. |
| 6 | AU | ON | 9863. |
| 9 | AU | ON | 9114. |
| 15 | AU | ON | 30000. |
| 16 | AU | ON | 30000. |
| 12 | AU | ON | 14500. |
| 13 | AU | ON | 13500. |
| 14 | AU | ON | 12000. |
| 91 | AU | OF | 0. |
| 92 | AU | OF | 0. |
| 93 | AU | OF | 0. |
| 94 | AU | OF | 0. |

? E
```
UPTAP   823 S       1
UPTAP   844 S       1
DNTAP   865 S       1
```
 COMPUTER GENERATED DEMAND PULSE 
  DEMAND PERIOD ENDING    4/ 9 12:16:59  (W)2515 CONTROLLER ON    AU
    LIMIT=215000. KW    ACTUAL=198976. KW    LOADFACTOR= 92.5 %
    ENERGY USED= 49744.KWH    (W)2515 CONTROLLED= -4915.KWH
  RKVA LIMIT=      0. KVAR           ACTUAL=      0. KVAR

TABLE 19 CONT.

| FURN | KWH USED |
|---|---|
| 4 | 2540. |
| 6 | 2520. |
| 9 | 2180. |
| 15 | 7020. |
| 16 | 6660. |
| 12 | 1360. |
| 13 | 1260. |
| 14 | 1100. |
| 91 | 0. |
| 92 | 0. |
| 93 | 0. |
| 94 | 0. |

OFF   63 S        8
? Q

FURNACE STATUS LOG    4/ 9 12:18:32

| FURN | AU/MA | ON/OFF | CURR KW |
|---|---|---|---|
| 4 | AU | ON | 10000. |
| 6 | AU | ON | 9863. |
| 9 | AU | ON | 9114. |
| 15 | AU | ON | 30000. |
| 16 | AU | ON | 30000. |
| 12 | AU | ON | 14500. |
| 13 | AU | ON | 13500. |
| 14 | AU | OF | 0. |
| 91 | AU | OF | 0. |
| 92 | AU | OF | 0. |
| 93 | AU | OF | 0. |
| 94 | AU | OF | 0. |

? E
UPTAP  263 S       3
DNTAP  285 S       3
UPTAP  374 S       3
DNTAP  396 S       3
UPTAP  485 S       2
DNTAP  507 S       2
OFF    574 S       7
UPTAP  589 S       1

TABLE 20

COMPUTER GENERATED DEMAND PULSE 
DEMAND PERIOD ENDING   4/ 9 12:31:59 (W)2515 CONTROLLER ON    AU
   LIMIT=215000. KW   ACTUAL=214855. KW   LOADFACTOR= 99.9 %
   ENERGY USED= 53714.KWH    (W)2515 CONTROLLED=  4016.KWH
RKVA LIMIT=       0. KVAR          ACTUAL=       0. KVAR

| FURN | KWH USED |
|---|---|
| 4 | 2480. |
| 6 | 2480. |
| 9 | 2240. |
| 15 | 7620. |
| 16 | 7620. |
| 12 | 3660. |
| 13 | 2160. |
| 14 | 220. |
| 91 | 0. |
| 92 | 0. |
| 93 | 0. |
| 94 | 0. |

TABLE 21
```
OFF     61 S      6
DNREF   61 S      5
DNTAP   70 S      5
UPTAP  130 S      3
DNREF  139 S      5
DNTAP  147 S      5
? Q
   FURNACE STATUS LOG    4/ 9 12:34:49
    FURN   AU/MA   ON/OFF   CURR KW
      4     AU      ON       9863.
      6     AU      ON      10000.
      9     AU      ON       9231.
     15     AU      ON      30000.
     16     AU      ON      26748.
     12     AU      OF          0.
     13     AU      OF          0.
     14     AU      OF          0.
     91     AU      OF          0.
     92     AU      OF          0.
     93     AU      OF          0.
     94     AU      OF          0.
? C
 FN LN  HISET     PSET      LOSET    PDBND    PERR    PUPSETCH  PFBK
  4  1  10000.   10000.     8000.    300.     137.     0.160    9863.
  6  2  10000.   10000.     8000.    300.       0.     0.160   10000.
  9  3   9000.    9000.     7000.    300.    -231.     0.180    9231.
 15  4  30000.   28200.    24000.    600.   -1800.     0.060   30000.
 16  5  30000.   24000.    24000.    600.    -580.     0.060   24580.
? E
DNREF   190 S      5
DNTAP   190 S      4
DNREF   278 S      4      5
DNREF   322 S      4
DNTAP   331 S      4
DNREF   376 S      4
DNREF   430 S      3      4
DNTAP   439 S      3
UPTAP   439 S      5
DNTAP   458 S      5
DNREF   531 S      2      3
DNTAP   540 S      2
UPTAP   540 S      4      5
DNTAP   550 S      3
UPTAP   614 S      2
? C
 FN LN  HISET     PSET      LOSET    PDBND    PERR    PUPSETCH  PFBK
  4  1  10000.    8400.     8000.    300.   -1614.     0.160   10014.
  6  2  10000.    8000.     8000.    300.    -493.     0.160    8493.
  9  3   9000.    7000.     7000.    300.      83.     0.180    6917.
 15  4  30000.   24000.    24000.    600.    -245.     0.060   24245.
 16  5  30000.   24000.    24000.    600.    -549.     0.060   24549.
? Q
   FURNACE STATUS LOG    4/ 9 12:43:33
    FURN   AU/MA   ON/OFF   CURR KW
      4     AU      ON       9256.
      6     AU      ON       7828.
      9     AU      ON       6923.
     15     AU      ON      24270.
     16     AU      ON      24549.
     12     AU      OF          0.
     13     AU      OF          0.
     14     AU      OF          0.
```

TABLE 21 CONT.

```
    91      AU     OF       0.
    92      AU     OF       0.
    93      AU     OF       0.
    94      AU     OF       0.
? E
 DNREF    652 S    1    2
 UPTAP    652 S    2
 DNREF    764 S    1
 UPTAP    836 S    2
```
 COMPUTER GENERATED DEMAND PULSE

TABLE 22

```
 PRIORITY STATUS    4/ 9 13:27:27
  FURN    LN    PRI
    4      1    12
    6      2    11
    9      3    10
   15      4     9
   16      5     8
   12      6     7
   13      7     6
   14      8     5
   91      9     4
   92     10     3
   93     11     2
   94     12     1
? J
ENTER AIRCO FURN NO.,PRIORITY12,12
FURN 12 PRI IS 12 WAS   7
? J
ENTER AIRCO FURN NO.,PRIORITY13,11
FURN 13 PRI IS 11 WAS   6
? J
ENTER AIRCO FURN NO.,PRIORITY14,10
FURN 14 PRI IS 10 WAS   5
? G
 PRIORITY STATUS    4/ 9 13:29:25
  FURN    LN    PRI
    4      1     9
    6      2     8
    9      3     7
   15      4     6
   16      5     5
   12      6    12
   13      7    11
   14      8    10
   91      9     4
   92     10     3
   93     11     2
   94     12     1
? E
 UPTAP    628 S    1
 ON       895 S    8
```
 COMPUTER GENERATED DEMAND PULSE 
```
 DEMAND PERIOD ENDING  4/ 9 13:31:59 (W)2515 CONTROLLER ON   AU
   LIMIT=215000. KW   ACTUAL=214521. KW   LOADFACTOR= 99.8 %
   ENERGY USED= 53630.KWH   (W)2515 CONTROLLED= -2394.KWH
 RKVA LIMIT=      0. KVAR      ACTUAL=      0. KVAR
  FURN   KWH USED
    4     2500.
    6     2500.
```

TABLE 22 CONT.

| | |
|---|---|
| 9 | 2240. |
| 15 | 7620. |
| 16 | 7620. |
| 12 | 3660. |
| 13 | 2400. |
| 14 | 20. |
| 91 | 0. |
| 92 | 0. |
| 93 | 0. |

```
DNREF   61 S      5
DNTAP   68 S      5
DNREF  132 S      5
DNTAP  139 S      5
DNREF  189 S      5
DNREF  217 S      4     5
DNTAP  225 S      4     5
DNREF  290 S      4
DNTAP  297 S      4
DNREF  341 S      4
DNREF  401 S      3     4
DNTAP  408 S      3
DNTAP  423 S      4
DNREF  483 S      2     3
DNTAP  490 S      2
DNREF  558 S      1     2
DNTAP  558 S      1
UPTAP  566 S      4
DNREF  627 S      1
OFF    657 S   8
OFF    666 S   7
UPTAP  674 S      1
ON     683 S   7
DNTAP  699 S      1
UPTAP  740 S      4
DNTAP  764 S      4
UPTAP  772 S      1
```

COMPUTER GENERATED DEMAND PULSE 
 DEMAND PERIOD ENDING  4/ 9 13:46:59 (W)2515 CONTROLLER ON    AU
   LIMIT=215000. KW   ACTUAL=214875. KW   LOADFACTOR= 99.9 %
   ENERGY USED= 53719.KWH   (W)2515 CONTROLLED=  3823.KWH
 RKVA LIMIT=      0. KVAR         ACTUAL=      0. KVAR

| FURN | KWH USED |
|---|---|
| 4 | 2320. |
| 6 | 2300. |
| 9 | 1960. |
| 15 | 6540. |
| 16 | 6240. |
| 12 | 3630. |
| 13 | 3340. |
| 14 | 2200. |
| 91 | 0. |
| 92 | 0. |
| 93 | 0. |
| 94 | 0. |

```
ON     61 S    8
UPREF  61 S       1
UPTAP  69 S       1
? C
```

TABLE 22 CONT.

| FN | LN | HISET | PSET | LOSET | PDBND | PERR | PUPSETCH | PFBK |
|---|---|---|---|---|---|---|---|---|
| 4 | 1 | 10000. | 9280. | 8000. | 300. | 937. | 0.160 | 8343. |
| 6 | 2 | 10000. | 8000. | 8000. | 300. | 89. | 0.160 | 7911. |
| 9 | 3 | 9000. | 7000. | 7000. | 300. | 208. | 0.180 | 6792. |
| 15 | 4 | 30000. | 24000. | 24000. | 600. | 264. | 0.060 | 23736. |

| FURN | AU/MA | ON/OFF | CURR KW |
|---|---|---|---|
| 4 | AU | ON | 9326. |
| 6 | AU | ON | 8067. |
| 9 | AU | ON | 6735. |
| 15 | AU | ON | 23713. |
| 16 | AU | ON | 23741. |
| 12 | AU | ON | 14500. |
| 13 | AU | ON | 13500. |
| 14 | AU | ON | 12000. |
| 91 | AU | OF | 0. |
| 92 | AU | OF | 0. |
| 93 | AU | OF | 0. |
| 94 | AU | OF | 0. |

? G

The following comments can be made regarding the preceding simulated operations:

Referring to Table 1, a log indicates furnaces 4, 6, 9, 15, 16, 12, 13, and 14 in use with the KWH used.

Table 2 shows ON and OFF switching events (4 seconds and 316 seconds into the demand period) of loads 6, 7, 8 which are ON/OFF loads and identical to furnaces 12, 13, 14, and the status of the regulating loops set for the respective furnaces 4, 6, 9, 15, 16 designated as loads 1 to 5 in priority order. For each load the upper setting (HISET) and the lowest setting (LOSET) are indicated in kilowatts. The particular setting is PSET which is at the lowest for all loads. DNTAP indicates a request by the inner loop to lower setting while UPTAP indicates a request by the inner loop to raise the setting of the outer loop in relation to the load indicated. The statement "711S 5" relative to the first DNTAP indicates a tap lowering on load #5 (furnace 16) at 711 sec. into the demand period.

Table 3 is a log giving the KWH used per load, at the time indicated, for the demand period just completed.

In Table 4, on the first line load #1 has its reference set point (PSET) raised (UPREF) by the outer loop and as a result, as shown by line 2, (UPTAP) the tap changer of load #1 is asked by the inner loop to raise the KW consumption. It is observed that for all the loads of Table 4, as shown by the duration of the instruction, the system is still initializing itself following the start of the simulation—e.g. trying to have the loads in the highest priority (order 1, 2, 3 etc.) take most of the power.

Table 5 is the third demand log in the simulation and shows the KWH actually used at the end of the demand period under power demand control, with a demand limit of 185,000 KW. Loads 4, 6, 9, 15, 16, 12, and 13 were actually in use sometime during the demand period. In this situation, referring to Table 6 which includes UPTAP and DNTAP for loads 1 and 2, it is observed that loads 1, 2, 3, 4, and 5, which were initially (Table 2) in their lowest setting have now been moved up to a maximum allowable value (HISET).

Table 7 (time 10:51:24) is an operator requested status log and indicates that furnaces 4, 6, 9, 15, 16, 17, 13 are on automatic control (AU) and are ON, while loads 14, 91, 92, 93, 94 are OFF.

Referring now to Table 8, the loads 6 and 7 have been switched off at 316 seconds into the demand period. This load adjustment evidently was not enough, for the outer loop then reduced PSET on load 5, followed by a tap reduction by the inner loop. As shown in Table 8, lower priority loads are turned OFF or down first (first loads 8, 7, 6 (furnaces 14, 13, 12) are turned off, followed by load 5 (furnace 16) with DNREF and DNTAP, then followed by load #4 starting in the down direction after load #5 has been down to the lowest setting (LOSET)). The resultant DNTAP's (and normal regulating action UP/DNTAP's on other loads such as 2 and 4 due to inner loop regulating action) appear in Table 8.

As a result, (Table 9) loads 1, 2, 3 have become HISET. Load 15, however, is set at an intermediary tap setting (24,918 kilowatts). Also on Table 9, it is shown that when load #4 is fully down, load #3 starts moving down.

Table 10, then indicates that loads #1, (highest priority), and #2 are at maximum consumption (HISET) while loads #4 and #5 (lowest priority) are at minimum consumption (LOSET), and consuming energy somewhat above lowest setting (7380 PSET for 7000 LOSET).

Table 11 shows more adjustments of loads #2 and #1 and Table 12 shows the next demand log. The demand limit is 185,000 KW; the actual consumption is 193,951 KW. Thus, the goal has not yet been achieved fully.

Table 13 shows the first control steps into the next demand period. The "no control" time has now been reduced to 60 sec. instead of 315 sec. This allows the loads to be turned OFF or DOWN sooner, thus permitting a faster response in the desired direction.

Referring to Table 14, loads 1-4 are at the maximum consumption allowed by the respective set points (HISET), while load 5 is being used to regulate the demand. Further, under Table 14, loads 6 and 7 just came ON.

Table 15 shows the next 15 minute demand period under power demand limit control. The limit has been achieved. At the end of Table 15, the demand limit is reduced to 175,000 KW; PSET on loads 5 and then 4 are consequently reduced.

Under Table 16 it is observed that load 5 is all the way down, while load 4 is almost there too. Load reduction continues to occur. Under Table 17 all the loads are down as far as they can, and the demand limit was not reduced far enough.

Table 18 shows load being, later on, picked up on higher priority loads (1, 2, 3). At the end of the next demand period, as shown in Table 18 and initially in Table 19, a stable condition has been achieved in which loads 1 and 2 are at maximum power, load 3 is used for control, and loads 4 and 5 are at minimum power. The limit is then raised to 215,000 KW. Loads are increased and restored throughout Table 19, and, referring to Table 20, the loads have been adjusted in order to meet a new demand limit of 215,000 KW.

Table 21 indicates the system reaction to an external event, namely an external CCI reducing the demand to 90,000 KW. All ON/OFF furnaces are turned OFF, and the PSET's are reduced to reduced plant load.

Table 22 indicates the response to an on line priority change. Furnace 12 (load 6) is changed to priority 12 (the highest), and furnaces 13 and 14 (loads 7 and 8) changed to priority 11 and 10 (second and third highest). This moves the ON/OFF loads from low priority to high priority as indicated by the priority status log, leaving loads 5, 4, 3 (furnaces 16, 15, 9) at low priorities. The subsequent printout of Table 22 indicates load 8 coming ON and 5, then 4, then 3 having PSET reduced to allow 6, 7, and 8 to remain ON.

The preceding are illustrative of the load distribution under various circumstances. The furnaces regulated by an inner loop and controlled by the computer with the outer loop, appear to be fully integrated within a system of loads of the ON/OFF states type, and to concur in meeting the demand limit while minimizing the effect on production.

OPERATION WITH A MODIFIED ALGORITHM

The following TTY printouts record operations are similar to the preceding one except as follows:
1. The KW regulating loop wait time is 120 seconds.
2. The demand control interface to the KW regulating loops has been modified to
   a. Change PREF by the entire projected demand error if possible (limited by LOSET/HISET) rather than by a fixed % of PSET.
   b. Change PREF without regard to whether or not the furnace is in wait time (although tap changes are still not initiated within the furnace wait time).

The purpose of these modifications is to provide faster tap changer response to large demand limit changes.

Again '?' replaces 'ENTER PASSWORD SU, ENTER CODE LETTER'. Load values, priorities, etc., are as before.

Table 23 indicates a demand limit increase to 215,000 KW. Notice how the PSET's of several furnaces are simultaneously increased, as well as having 6 and 7 loads turned ON all at 561 sec. into the demand period. At the end of the next period, at 9:58:23, the desired limit is reached.

Table 24 indicates a demand limit reduction to 175,000 KW. Again, loads are rapidly shed and/or reduced so that the next demand period at 10:28:23, shows only 3.3% over limit, and the next one, at 10:48:23, shows right on limit with loads 2 through 5 at LOSET, 6 through 8 OFF, and load 1 regulating to maintain the limit.

TABLE 23

```
? Z
DR:1,2382,215000.
 2382=   0.215000E 06
UPTAP   496 S       2
ON      561 S       6       7
UPREF   561 S       2       3       4       5
UPTAP   561 S       4
ON      577 S       8
UPTAP   577 S       3       5
UPTAP   665 S       1
DNTAP   735 S       1
UPTAP   953 S       3
DNTAP  1072 S       3
UPTAP  1079 S       2
UPTAP  1093 S       5
DNTAP  1198 S       2
? C
```

| FN | LN | HISET | PSET | LOSET | PDBND | PERR | PUPSETCH | PFBK |
|---|---|---|---|---|---|---|---|---|
| 4 | 1 | 10000. | 10000. | 8000. | 300. | 139. | 0.160 | 9861. |
| 6 | 2 | 10000. | 10000. | 8000. | 300. | -2019. | 0.160 | 12019. |
| 9 | 3 | 9000. | 9000. | 7000. | 300. | 221. | 0.180 | 8779. |
| 15 | 4 | 30000. | 30000. | 24000. | 600. | 0. | 0.060 | 30000. |
| 16 | 5 | 30000. | 30000. | 24000. | 600. | 0. | 0.060 | 30000. |

```
? E
UPTAP  1296 S       1
? C
```

| FN | LN | HISET | PSET | LOSET | PDBND | PERR | PUPSETCH | PFBK |
|---|---|---|---|---|---|---|---|---|
| 4 | 1 | 10000. | 10000. | 8000. | 300. | -119. | 0.160 | 10119. |
| 6 | 2 | 10000. | 10000. | 8000. | 300. | -1645. | 0.160 | 11645. |
| 9 | 3 | 9000. | 9000. | 7000. | 300. | 220. | 0.180 | 8780. |
| 15 | 4 | 30000. | 30000. | 24000. | 600. | 0. | 0.060 | 30000. |
| 16 | 5 | 30000. | 30000. | 24000. | 600. | 0. | 0.060 | 30000. |

TABLE 23 CONT.
```
? E
 DNTAP 1324 S      2
 ? Z
 DID,204B
  204B=    2017
 UPTAP 1751 S      2
** COMPUTER GENERATED DEMAND PULSE **
 DEMAND PERIOD ENDING   4/13   9:58:23  (W)2515 CONTROLLER ON    AU
    LIMIT=215000. KW    ACTUAL=213050. KW    LOADFACTOR= 99.1 %
    ENERGY USED=106525.KWH    (W)2515 CONTROLLED=-18797.KWH
 RKVA LIMIT=       0. KVAR         ACTUAL=       0. KVAR
 FURN   KWH USED
    4       5120.
    6       5020.
    9       4320.
   15      13980.
   16      13920.
   12       5060.
   13       4680.
   14       4120.
   91          0.
   92          0.
   93          0.
   94          0.
 OFF   66 S      8
 DNTAP    73 S      2
 ? C
 FN  LN   HISET.    PSET      LOSET    PDBND   PERR   PUPSETCH  PFBK
  4   1  10000.   10000.    8000.    300.    134.    0.160    9866.
  6   2  10000.   10000.    8000.    300.    137.    0.160    9863.
  9   3   9000.    9000.    7000.    300.    220.    0.180    8780.
 15   4  30000.   30000.   24000.    600.      0.    0.060   30000.
 16   5  30000.   30000.   24000.    600.      0.    0.060   30000.
 ? G
 PRIORITY STATUS    4/13 10: 0:49
   FURN    LN    PRI
     4      1    12
     6      2    11
     9      3    10
    15      4     9
    16      5     8
    12      6     7
    13      7     6
    14      8     5
    91      9     4
    92     10     3
    93     11     2
    94     12     1
 ? Q
 FURNACE STATUS LOG    4/13 10: 1:34
   FURN    AU/MA   ON/OFF    CURR KW
     4      AU      ON        9863.
     6      AU      ON        9863.
     9      AU      ON        8780.
    15      AU      ON       30000.
    16      AU      ON       30000.
    12      AU      ON       14500.
    13      AU      ON       13500.
    14      AU      OF           0.
    91      AU      OF           0.
    92      AU      OF           0.
    93      AU      OF           0.
    94      AU      OF           0.
 ? E
```

TABLE 24

```
? Z
DRM,2382,175000.
 2382=  0.1750000E 06
OFF    295 S       6       7
DNREF  295 S       2       3       5
DNTAP  295 S       2
DNREF  304 S       1       4
DNTAP  304 S       4
DNTAP  313 S       1
DNTAP  374 S       3       5
? C
```

| FN | LN | HISET  | PSET   | LOSET  | PDBND | PERR   | PUPSETCH | PFBK   |
|----|----|--------|--------|--------|-------|--------|----------|--------|
| 4  | 1  | 10000. | 8000.  | 8000.  | 300.  | -203.  | 0.160    | 8203.  |
| 6  | 2  | 10000. | 8000.  | 8000.  | 300.  | 146.   | 0.160    | 7854.  |
| 9  | 3  | 9000.  | 7000.  | 7000.  | 300.  | -1394. | 0.180    | 8394.  |
| 15 | 4  | 30000. | 24000. | 24000. | 600.  | -3034. | 0.060    | 27034. |
| 16 | 5  | 30000. | 24000. | 24000. | 600.  | -4459. | 0.060    | 28459. |

```
? E
UPTAP  510 S       3
? C
```

| FN | LN | HISET  | PSET   | LOSET  | PDBND | PERR   | PUPSETCH | PFBK   |
|----|----|--------|--------|--------|-------|--------|----------|--------|
| 4  | 1  | 10000. | 8000.  | 8000.  | 300.  | 174.   | 0.160    | 7826.  |
| 6  | 2  | 10000. | 8000.  | 8000.  | 300.  | 174.   | 0.160    | 7826.  |
| 9  | 3  | 9000.  | 7000.  | 7000.  | 300.  | -1372. | 0.180    | 8372.  |
| 15 | 4  | 30000. | 24000. | 24000. | 600.  | 522.   | 0.060    | 23478. |
| 16 | 5  | 30000. | 24000. | 24000. | 600.  | 264.   | 0.060    | 23736. |

```
? E
DNTAP  633 S       3
? S
    FURNACE STATUS LOG    4/13 10: 9:18
     FURN   AU/MA   ON/OFF   CURR KW
       4     AU      ON       7826.
       6     AU      ON       7826.
       9     AU      ON       7678.
      15     AU      ON      23479.
      16     AU      ON      23772.
      12     AU      OF          0.
      13     AU      OF          0.
      14     AU      OF          0.
      91     AU      OF          0.
      92     AU      OF          0.
      93     AU      OF          0.
      94     AU      OF          0.
? E
UPTAP  639 S       2
UPTAP  756 S       1
DNTAP  812 S       2
UPTAP  831 S       5
? C
```

| FN | LN | HISET  | PSET   | LOSET  | PDBND | PERR   | PUPSETCH | PFBK   |
|----|----|--------|--------|--------|-------|--------|----------|--------|
| 4  | 1  | 10000. | 8000.  | 8000.  | 300.  | -182.  | 0.160    | 8182.  |
| 6  | 2  | 10000. | 8000.  | 8000.  | 300.  | -1488. | 0.160    | 9488.  |
| 9  | 3  | 9000.  | 7000.  | 7000.  | 300.  | 208.   | 0.180    | 6792.  |
| 15 | 4  | 30000. | 24000. | 24000. | 600.  | 522.   | 0.060    | 23478. |
| 16 | 5  | 30000. | 24000. | 24000. | 600.  | -270.  | 0.060    | 24270. |

```
? E
UPTAP  897 S       1
DNTAP 1018 S       1
DNTAP 1454 S       5
? Z
UPTAP 1663 S       5
UPTAP 1673 S       4
```

TABLE 24 CONT.
 COMPUTER GENERATED DEMAND PULSE 
 DEMAND PERIOD ENDING   4/13 10:28:23  (W)2515 CONTROLLER ON    AU
    LIMIT=175000. KW   ACTUAL=180757. KW    LOADFACTOR=103.3 %
    ENERGY USED= 90378.KWH.   (W)2515 CONTROLLED= 24991.KWH
RKVA LIMIT=    0. KVAR         ACTUAL=    0. KVAR
 FURN  KWH USED
   4    4240.
   6    4200.
   9    3700.
  15   12540.
  16   12780.
  12    1220.
  13    1120.
  14     220.
  91       0.
  92       0.
  93       0.
  94       0.

60 S  3 3 3 3 3    2 2 2 2 2    2 2
 ** DEMAND LIMIT EXCEEDED *******************

CURRENT POWER RATE 172340.KWH/H  PERIOD LENGTH  1800 SEC
 UPREF   81 S    1     2
 UPTAP   81 S    2
 UPREF   91 S    3
 UPREF  100 S    4
 UPTAP  100 S    1     3
 UPTAP  110 S    4
? C
 FU LN   HISET    PSET    LOSET   PDBND    PERR    PUPSETCH PFBK
  4  1  10000.  10000.   8000.   300.    1023.   0.160    8977.
  6  2  10000.  10000.   8000.   300.     673.   0.160    9327.
  9  3   9000.   9000.   7000.   300.    1276.   0.180    7724.
 15  4  30000.  26889.  24000.   600.     899.   0.060   25990.
 16  5  30000.  24000.  24000.   600.    -270.   0.060   24270.
? E
 DNREF  174 S    4
 UPTAP  192 S    2
 DNREF  201 S    1     2     3
? C
 FU LN   HISET    PSET    LOSET   PDBND    PERR    PUPSETCH PFBK
  4  1  10000.   8000.   8000.   300.   -2139.   0.160   10139.
  6  2  10000.   8000.   8000.   300.   -2418.   0.160   10418.
  9  3   9000.   7000.   7000.   300.   -2014.   0.180    9014.
 15  4  30000.  24000.  24000.   600.   -6000.   0.060   30000.
 16  5  30000.  24000.  24000.   600.    -269.   0.060   24269.
? E
 DNTAP  218 S    3
 DNTAP  263 S    1     4
 DNTAP  317 S    2
 UPREF  363 S    1
 UPREF  373 S    1
 UPTAP  382 S    1
? C
 FU LN   HISET    PSET    LOSET   PDBND    PERR    PUPSETCH PFBK
  4  1  10000.   9150.   8000.   300.     393.   0.160    8758.
  6  2  10000.   8000.   8000.   300.    1442.   0160     6558.
  9  3   9000.   7000.   7000.   300.      77.   0.180    6923.
 15  4  30000.  24000.  24000.   600.     264.   0.060   23736.
 16  5  30000.  24000.  24000.   600.    -232.   0.060   24232.
? E

TABLE 24 CONT.

```
UPREF  419 S    1
UPTAP  419 S    2
DNREF  475 S    1
DNTAP  502 S    1
DNREF  543 S    1
DNTAP  557 S    2
UPREF  585 S    1
UPREF  594 S    1
UPTAP  622 S    1
UPREF  632 S    1
UPREF  641 S    1
UPREF  660 S    1
UPREF  669 S    1
UPREF  678 S    1
UPREF  687 S    1
UPREF  697 S    1
UPREF  715 S    1
UPTAP  725 S    4
UPREF  753 S    2
UPREF  762 S    2
UPTAP  818 S    2
DNREF  873 S    2
DNTAP  938 S    2
? C
```

| FN | LN | HISET | PSET | LOSET | PDBND | PERR | PUPSETCH | PFBK |
|---|---|---|---|---|---|---|---|---|
| 4 | 1 | 10000. | 10000. | 8000. | 300. | -141. | 0.160 | 10141. |
| 6 | 2 | 10000. | 8608. | 8000. | 300. | -1006. | 0.160 | 9614. |
| 9 | 3 | 9000. | 7000. | 7000. | 300. | 77. | 0.180 | 6923. |
| 15 | 4 | 30000. | 24000. | 24000. | 600. | -545. | 0.060 | 24545. |
| 16 | 5 | 30000. | 24000. | 24000. | 600. | -270. | 0.060 | 24270. |

```
? E
DNREF 1020 S    1    2
DNTAP 1030 S    1
DNREF 1058 S    1
UPREF 1067 S    1
? C
```

| FN | LN | HISET | PSET | LOSET | PDBND | PERR | PUPSETCH | PFBK |
|---|---|---|---|---|---|---|---|---|
| 4 | 1 | 10000. | 9931. | 8000. | 300. | 1029. | 0.160 | 8902. |
| 6 | 2 | 10000. | 8000. | 8000. | 300. | 88. | 0.160 | 7912. |
| 9 | 3 | 9000. | 7000. | 7000. | 300. | 77. | 0.180 | 6923. |
| 15 | 4 | 30000. | 24000. | 24000. | 600. | -545. | 0.060 | 24545. |
| 16 | 5 | 30000. | 24000. | 24000. | 600. | -229. | 0.060 | 24229. |

```
? E
UPTAP 1152 S    1
? C
```

| FN | LN | HISET | PSET | LOSET | PDBND | PERR | PUPSETCH | PFBK |
|---|---|---|---|---|---|---|---|---|
| 4 | 1 | 10000. | 9931. | 8000. | 300. | 1278. | 0.160 | 8653. |
| 6 | 2 | 10000. | 8000. | 8000. | 300. | 88. | 0.160 | 7912. |
| 9 | 3 | 9000. | 7000. | 7000. | 300. | 68. | 0.130 | 6932. |
| 15 | 4 | 30000. | 24000. | 24000. | 600. | -545. | 0.060 | 24545. |
| 16 | 5 | 30000. | 24000. | 24000. | 600. | -270. | 0.060 | 24270. |

```
UPREF 1255 S    1    2
UPTAP 1264 S    2
UPREF 1273 S    2
DNREF 1292 S    1    2
DNTAP 1301 S    1
DNREF 1310 S    1
DNREF 1329 S    1
DNREF 1356 S    1
DNREF 1365 S    1
DNREF 1384 S    1
UPREF 1393 S    1
DNTAP 1393 S    2
```

TABLE 24 CONT.

| | | |
|---|---|---|
| UPTAP | 1393 S | 3 |
| UPREF | 1402 S | 1 |
| UPTAP | 1421 S | 1 |
| DNREF | 1449 S | 1 |
| DNTAP | 1513 S | 3 |
| DNTAP | 1541 S | 1 |
| DNTAP | 1606 S | 4 |
| UPREF | 1662 S | 1 |
| UPTAP | 1671 S | 1 |
| UPREF | 1709 S | 1 |
| UPTAP | 1794 S | 1 |

COMPUTER GENERATED DEMAND PULSE 
DEMAND PERIOD ENDING   4/13 10:58:23   (W)2515 CONTROLLER ON   AU
    LIMIT=175000. KW   ACTUAL=174868. KW   LOADFACTOR= 99.9 %
    ENERGY USED= 87434.KWH   (W)2515 CONTROLLED=   -782.KWH
RMVA LIMIT=        0. KVAR       ACTUAL=        0. KVAR

| FURN | KWH USED |
|---|---|
| 4 | 4560. |
| 6 | 4580. |
| 9 | 3620. |
| 15 | 12240. |
| 16 | 12120. |
| 12 | 0. |
| 13 | 0. |
| 14 | 0. |
| 91 | 0. |
| 92 | 0. |
| 93 | 0. |
| 94 | 0. |

FLOW DIAGRAMS DETAILING OPERATION OF THE PRESENT INVENTION

Figure 7A:
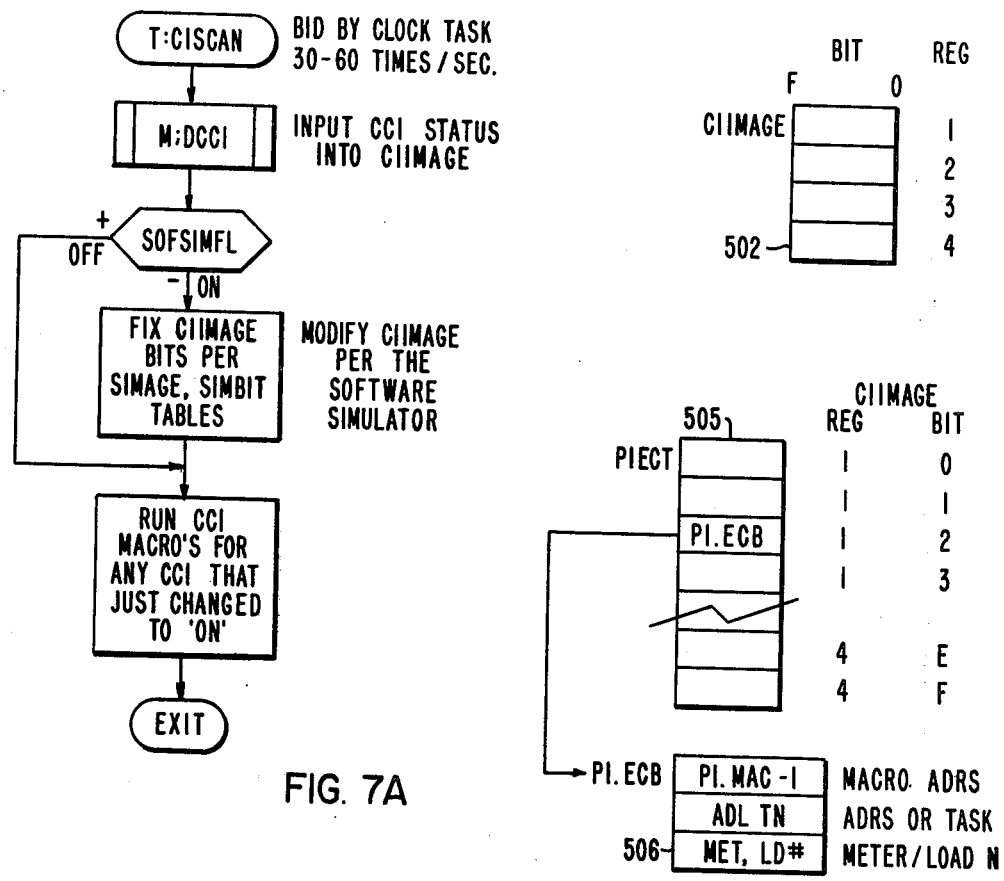
FIG. 7A is a flow chart showing tasks for handling CCI inputs in digital form.
Figure 8F:
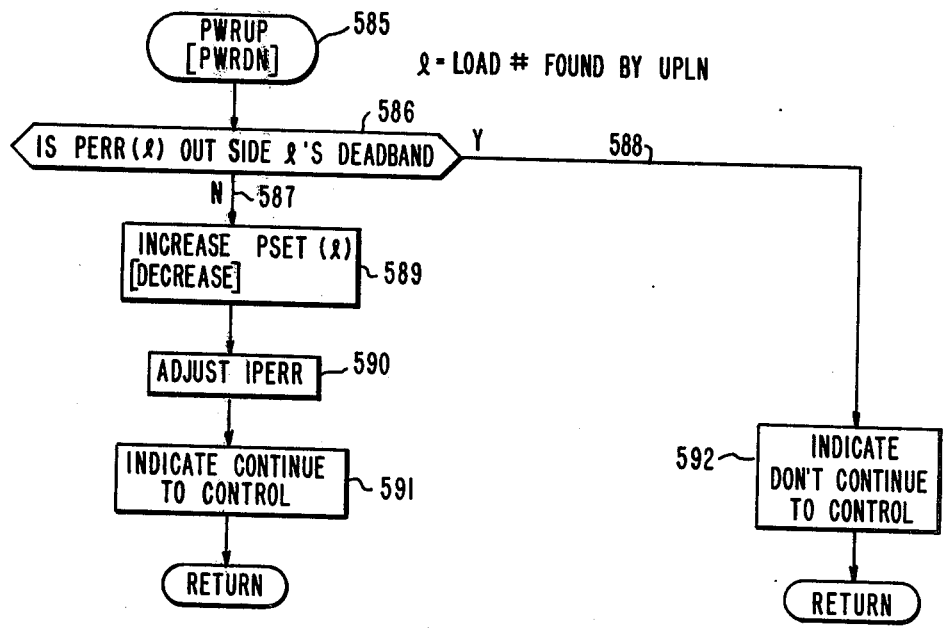
FIGS. 8A, 8B, 8C, 8D, 8E, and 8F are flow charts describing the operation of a power demand control system under monitoring and control of a digital computer system in accordance with the present invention.
Figure 7B:
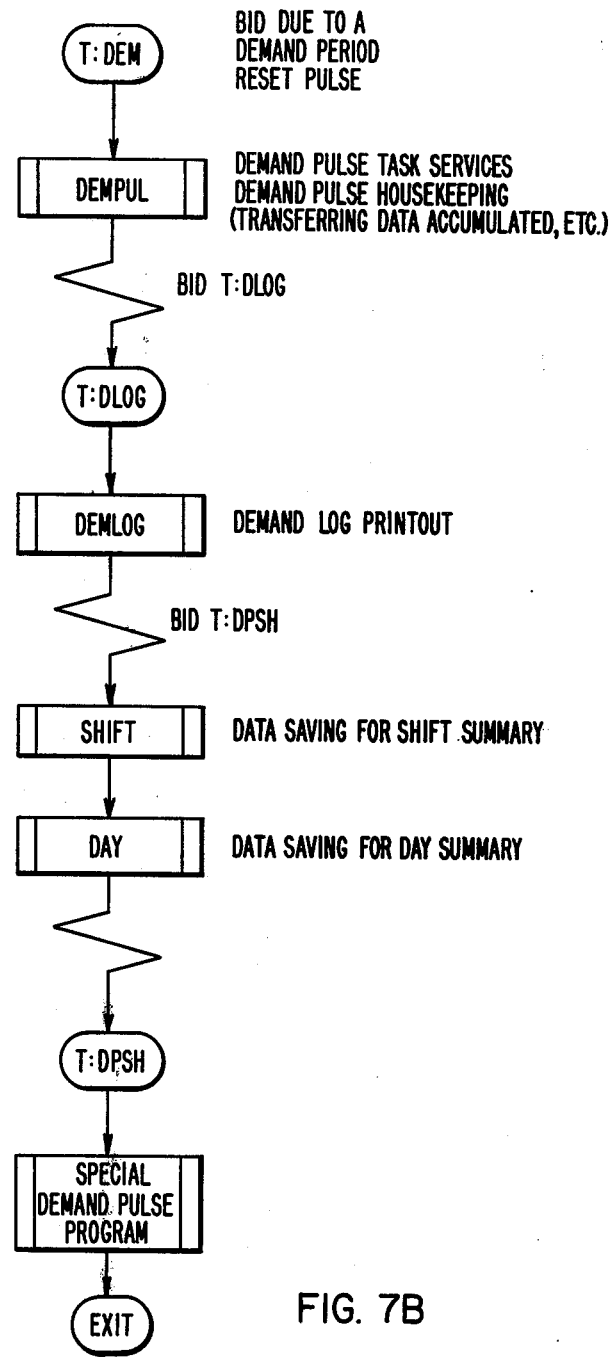
FIG. 7B shows control actions involving the receipt of a demand period timing pulse by the system.
Figure 8A:
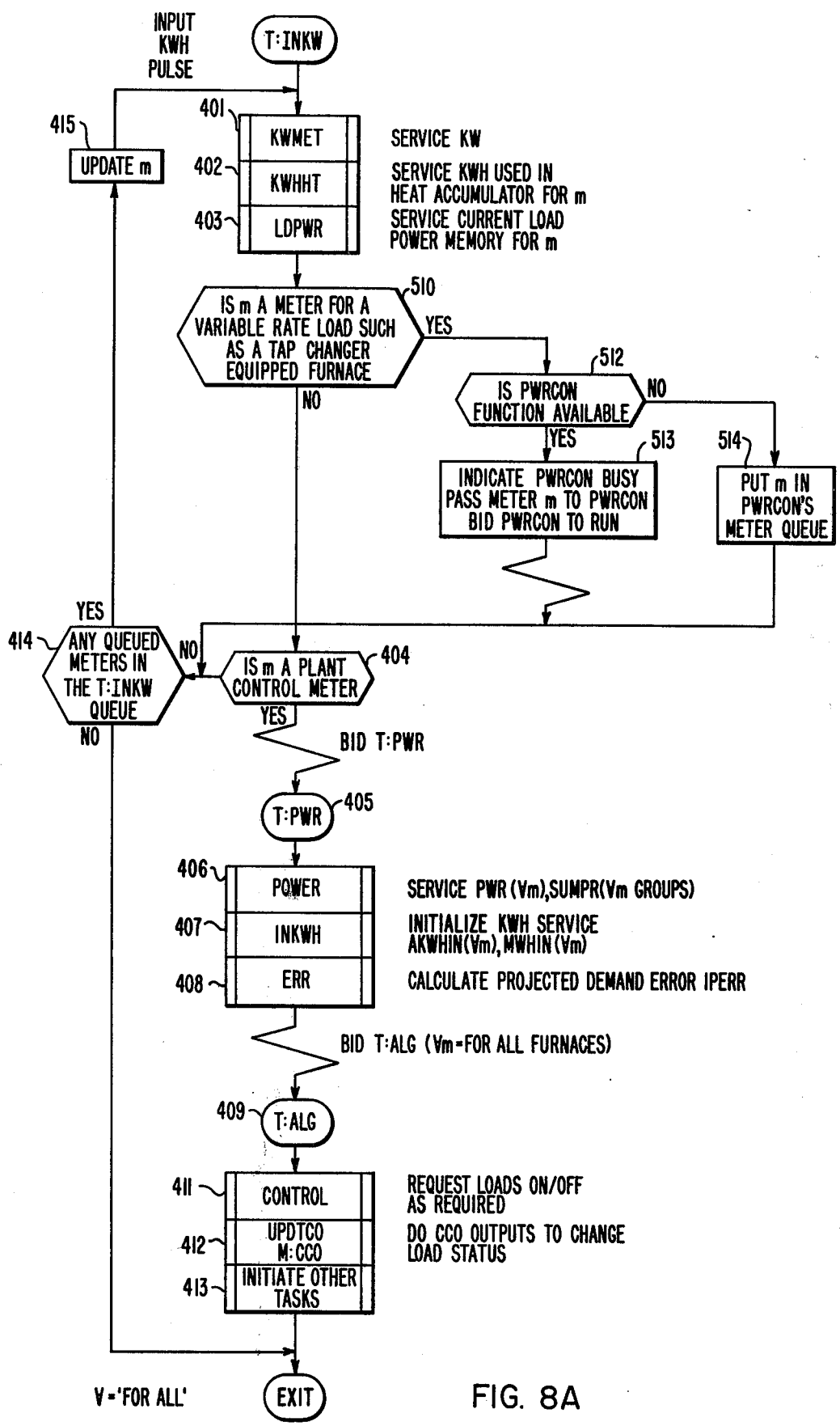
Figure 8B:
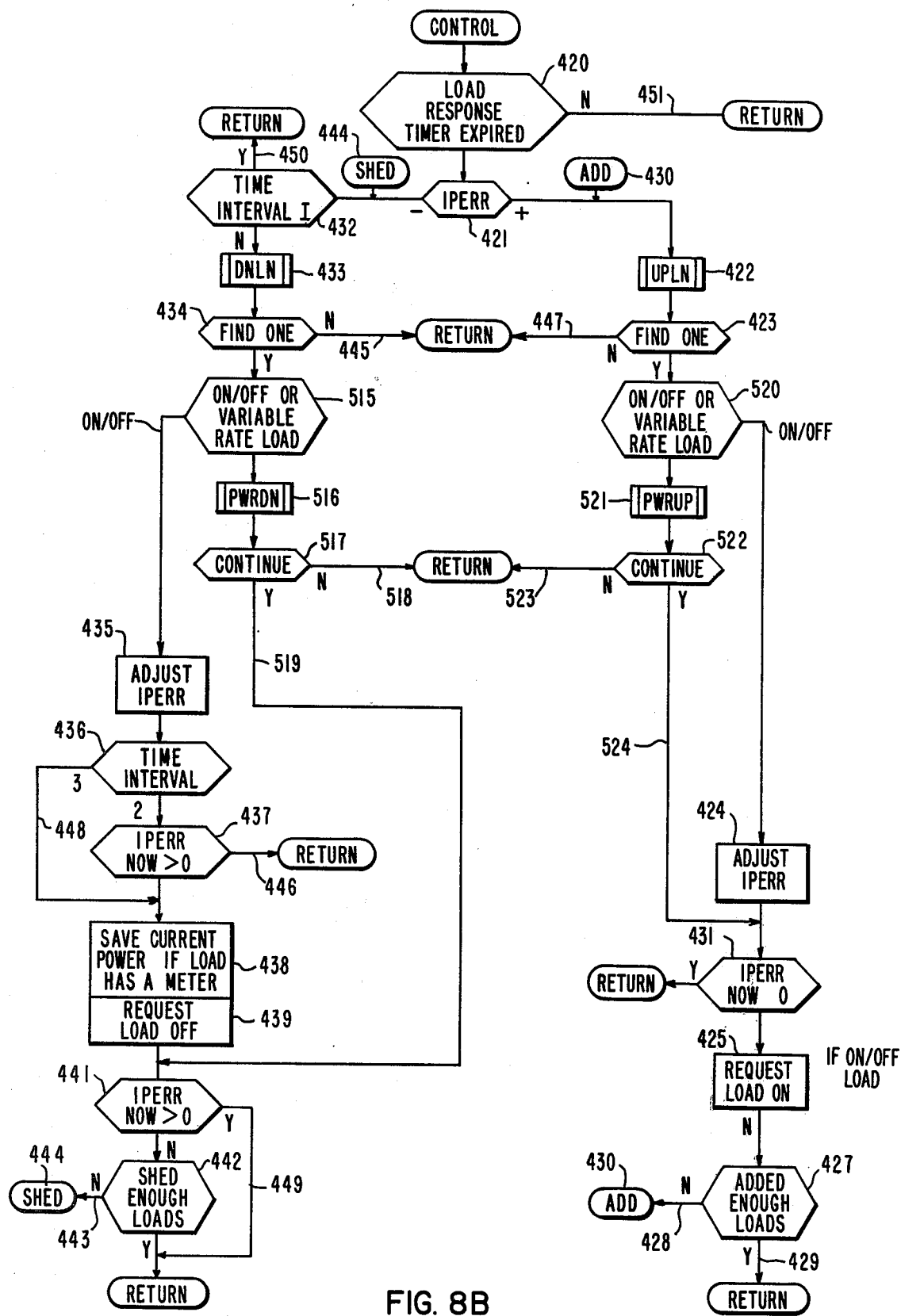
Figure 8C:
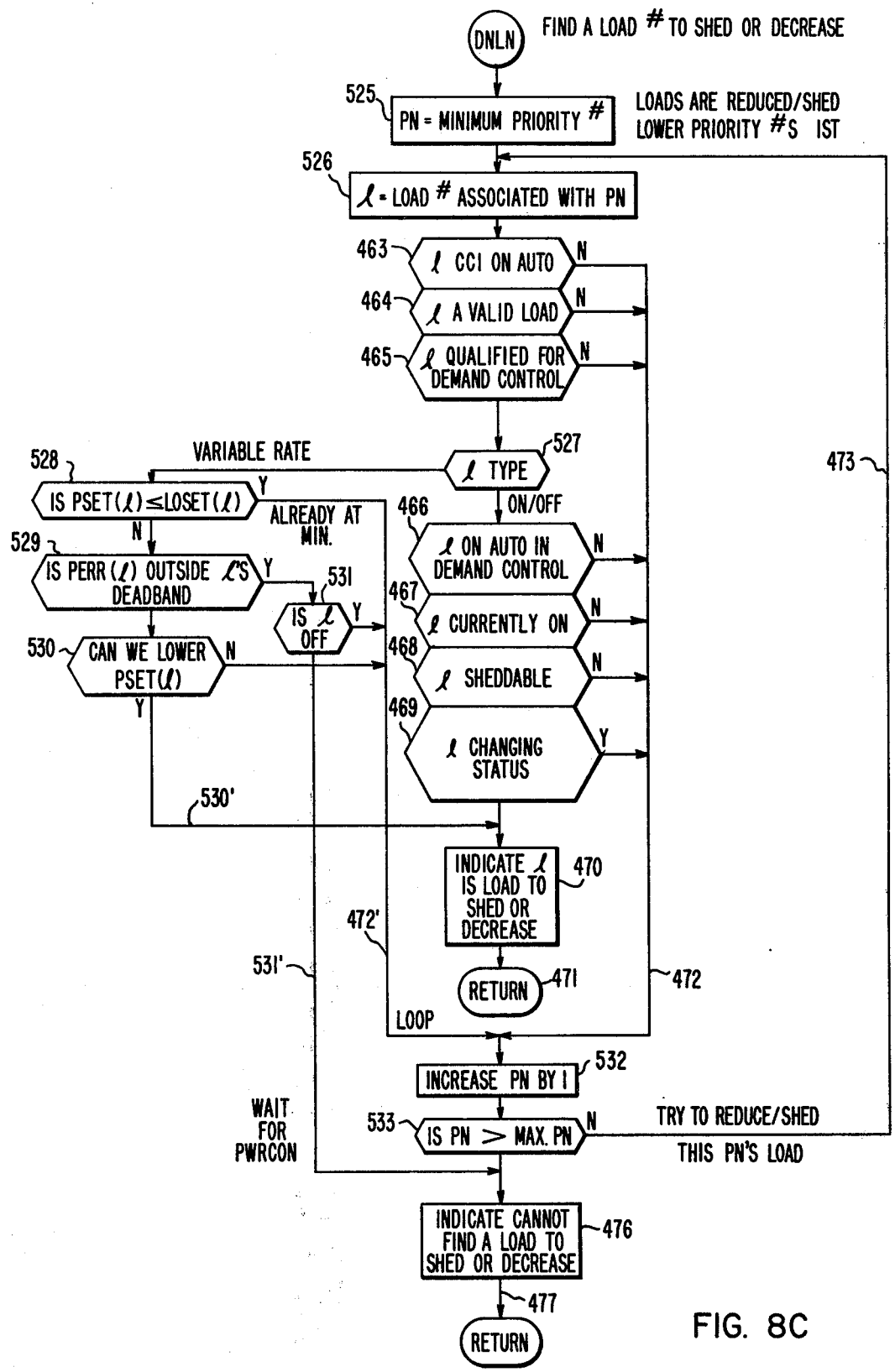
Figure 8D:
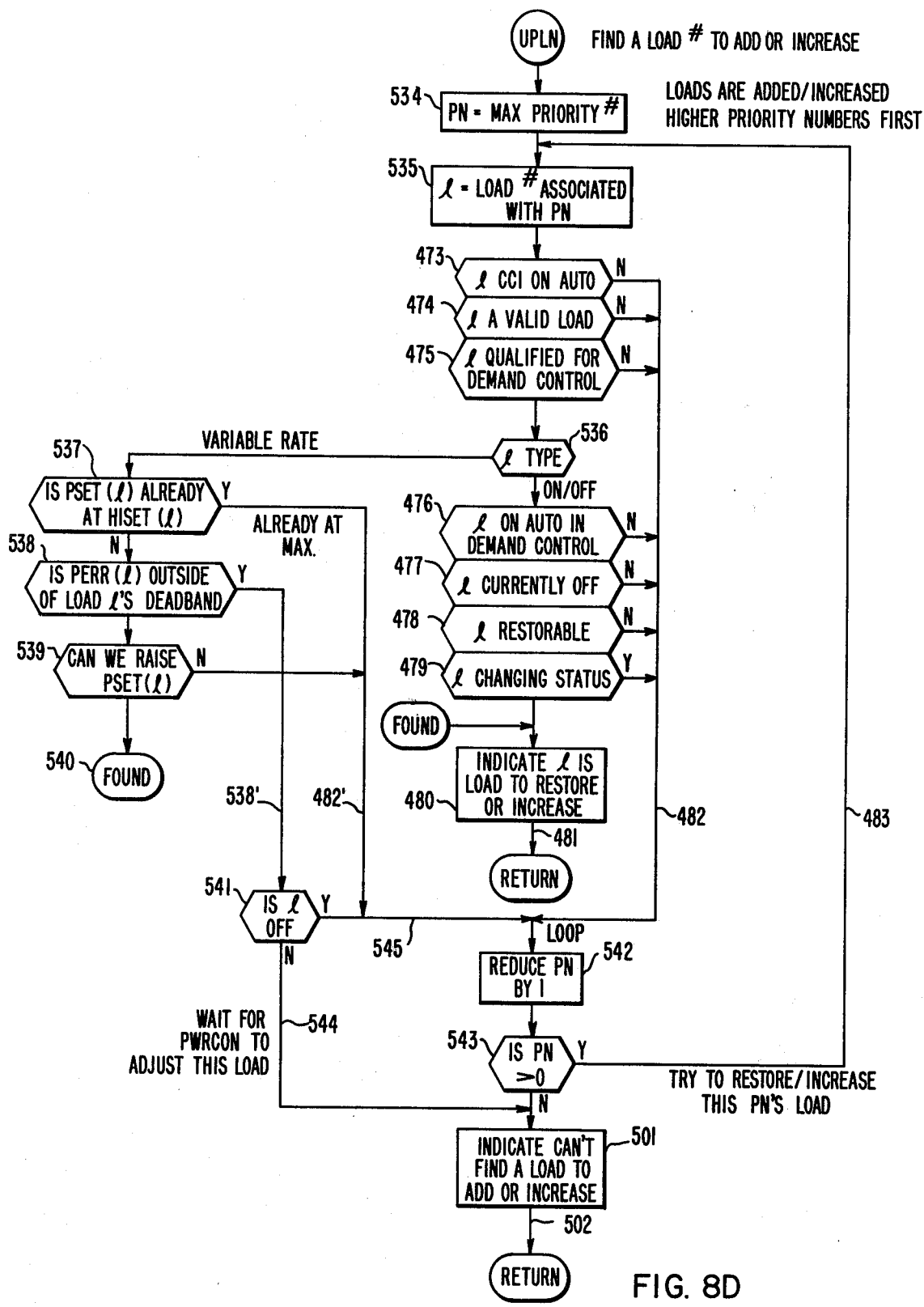
Figure 8E:
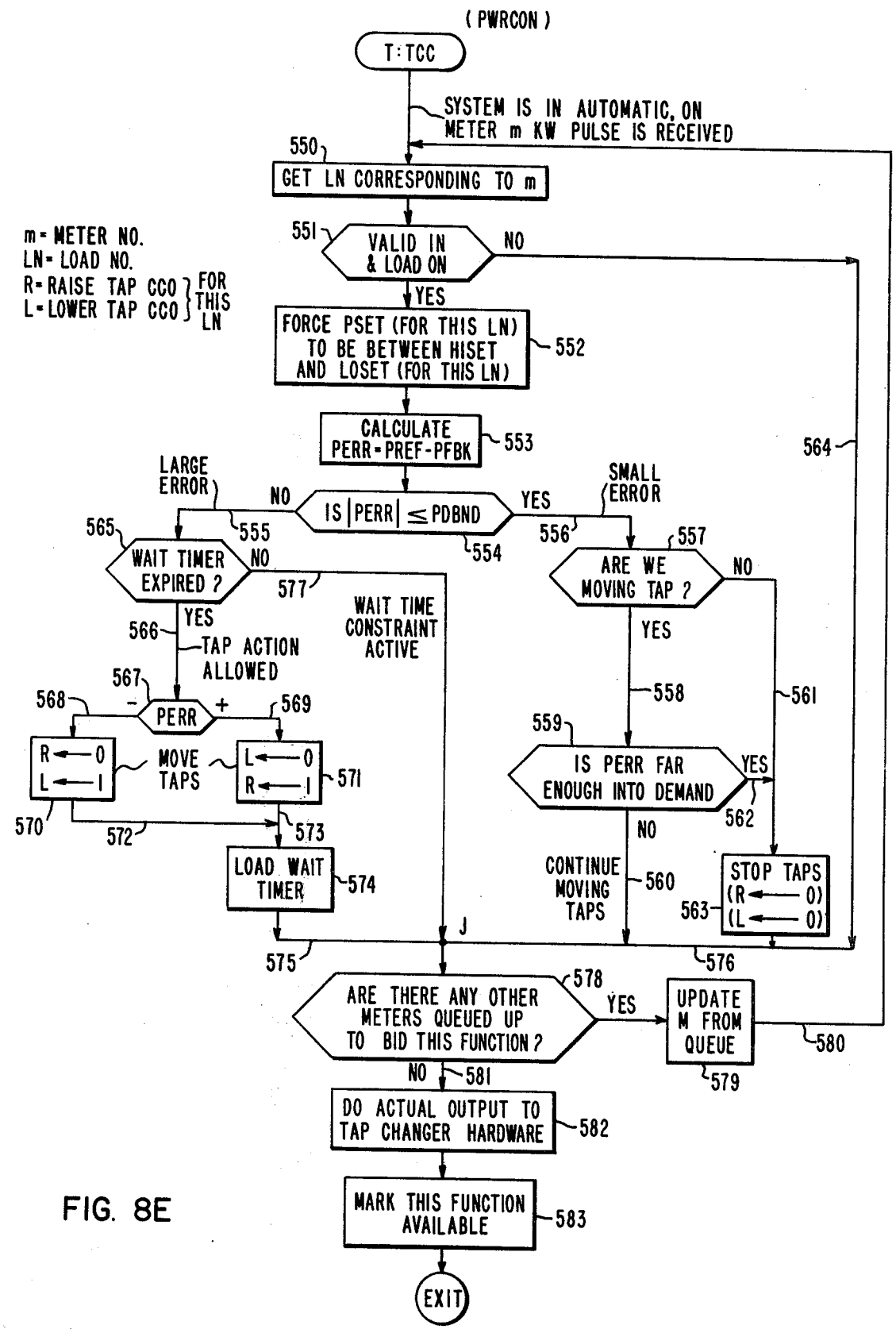

The principal operational sequences are triggered by detection of a computer system clock pulse, a demand period reset pulse, a KWH meter pulse, and various load information pulses. These sequences are detailed in the flow charts of FIGS. 7 and 8 which represent:

FIG. 7A—The CCI Input SCAN Task;
FIG. 7B—The Response to a Demand Pulse;
FIG. 8A—The Overall Response to Meter KWH pulses;
FIG. 8B—The Control Algorithm used when called at 411 of FIG. 8A;
FIG. 8C—The Load Decrease Selection for variable rate loads;
FIG. 8D—The Load Increase Selection for variable rate loads;
FIG. 8E—The routine used for regulating the regulating the selected load in the inner loop;
FIG. 8F—The routine used to adjust the setpoint PSET in the outer loop.

FIG. 7A shows in a flow chart form how the external interrupts (EI), or contact closure inputs (CCI), to the computer system at the interface thereof are scanned in order to derive in digital form a representation of the closure input status and how the data are treated in order to provide the resultant task bidding. 30 or 60 times per second there is a bid by the clock for the task of scanning the CCI as schematized on FIG. 7A. At 501 the status of the inputs of the CCI are ascertained and a digital representation is stored in, say, four registers 1–4 (at 502) which together give an image of the overall CCI system. This table (CIIMAGE) represents the current state of the contact closure inputs or interrupts being input to the controller. At times it may be desired to modify the same indicated by CIIMAGE in response to a 'software simulator' agent that provides a realistic simulation of the plant the controller is operating upon. At 503 the system determines whether such modification needs to be done. If yet, this is done at 504. The system then proceeds at 506, to run small programs ('CCI MACROS') for any CIIMAGE bits that just went from OFF to ON. To do this, the bits from register 502 are set in vertical order per register and used to access register 505. The purpose is to facilitate calls for macro instructions at 506 for any CCI that just changed to ON. The field of illustration at the particular location in 505 (PI. ECB), includes the address (PI. MAC-1) of the particular macro instruction, the particular task to be done (ADL TN) and the associated meter or load number (MET, LD#) related to the CCI state, as spelled out within the register shown at 506. One such CCI going from OFF to ON indicates the receipt of a demand pulse. It energizes a MACRO which in turn initiates the sequence shown on FIGS. 7B. It is described by the flow chart as actions occurring on the receipt of a demand pulse. This task is bid each time upon completion of a demand period by the reset pulse then issued. First at 507 certain actions are performed relative to 'demand pulse housekeeping' such as the recording or registers that record data from one demand pulse to the next and the initializing of these registers. Then, a task is bid for a demand log (T:D LOG) which entails at 508 a demand log printout (DEM-LOG). Another task relates to shift summary, that is a summary LOG that tabulates pertinent statistics by 8 hour shifts. Such task directs data saving for the shift summary (SHIFT at 509) as well as data saving for the day summary (DAY at 510). Still another task (DPSH) calls for optional special demand pulse programs at 511.

Referring now to FIG. 8A, the response of the computer system is there shown upon the receipt of a KWH meter pulse. As a result of such KWH meter pulse, the system provides at 401 indication as to which meter is selected and updates for that meter various memories indicative of the energy measured by the meter. The most important of such tables is the KW table, used to hold the 'DELTEE's', e.g., the Δt between two successive KWH pulses. At 402, the amount of KWH used in the present heat for the load (if any) associated with the present meter (KWHHT) for the particular load is updated. At 403, the current load power is set into a memory for the particular load. At 510 the question is raised whether the present meter (m) is for an adjustable load, e.g., a tap changer equipped furnace. If NO, the next step 404 connects with a loop for iteration through each meter that just pulsed. If at 510 the answer is YES, the next step is 512 for: "Is the function PWRCON available?" If at this state the answer is NO, the particular meter is (at 514) put in the meter queue waiting for the function PWRCON to be available. If the answer is YES, at 512, PWRCON is shown busy, and the output of meter m is used with the function PWRCON. In both instances, the system returns to step 414 for another iteration (a meter is additionally queued in the T:INKW queue) and m is updated at 415, before going back to 401. If a plant control meter is bid (Yes at 404) as opposed to an adjustable load meter, the task of computing the power (for all meters), of summing the consumed power (SUMPR) for the groups of load units, is performed at 406. At 407, if necessary, the meter energy is apportioned between the last demand period (if it just ended) and the present one. At 408, the demand error projected is estimated (IPERR).

As a result of such calculated errors, the control algorithm is put to task, at 409 in FIG. 8A.

In accordance with such control decisions, at 411 (detailed in FIG. 8B) request is made to switch the loads ON or OFF as required or increase or decrease power (CONTRL); at 412 the CCO outputs are actuated to change load states (UPDTCO, M:CCO); at 413 other tasks are initiated if appropriate.

FIG. 8B shows in flow chart form the control algorithm of stage 411 in FIG. 8A. The left side relates to load decrease or shedding (444), e.g., when there is an excessive demand (IPERR at 421 of FIG. 8B is negative). The right side shows the steps for adding load (ADD at 430) to raise the demand, e.g. when IPERR is positive at 421 in FIG. 8B). Initially, before the demand error IPERR is ascertained, the load response time must have expired (Yes at 420). If it is so, at 421 IPERR is calculated.

Assuming the error is negative (left side of IPERR) but the system operates in the first field of control, then Yes at 432 leads by 450 to a return, since no reduction is effected in the first field of control. All returns on FIG. 8B imply a return at 412 (FIG. 8A). When in the second field (No at 432), the system seeks at 433 a load to be decreased (variable load) or shed (ON/OFF load). If none is found there is a return by 445. If one is found and control operates in the second field, the system first goes to 515 to determine whether the load is an adjustable load or an ON/OFF load. If the load selected is an ON/OFF load, and it would bring IPERR at 437 to be positive (Y), the system returns by 446, because during the second field of control the system should not reduce load excessively. If the ON/OFF load selected would leave IPERR negative at 437, the system goes to 438. While still at 436, if the system operates in the third field of control, step 437 is skipped by 448 and again the load switching process will occur following steps 438 and the following.

Steps are taken at 438 to save current power if the load has a meter, and at 439 to request the selected load to be OFF. If, IPERR is still negative (NO), at 442 the circuit goes to 442 until enough loads have been shed. If (1) IPERR has become positive (Yes after 441) or (2) at 442 enough loads have been shed, then the system returns. The revised IPERR values are the 'residual error' values of Putman.

Returning to step 515, if the load selected is an adjustable load, at 516 the decision power down (PWRDN) is derived. If decrease of power can be continued, for the selected load, the system via 519 goes to 441 to test whether IPERR has become positive. If operation on such load has to be discontinued, by 518 the system returns for further selection.

Considering now the right side of FIG. 8B, namely if IPERR is positive, the system at UPLN (422) seeks loads to be added. If a load is found at 423, the system goes to 520 where the determination is made whether the selected load is an ON/OFF load or an adjustable load. If it is an ON/OFF load, the value of IPERR is adjusted (424). When IPERR becomes negative, the system by 431 (Yes) returns to start in order to avoid adding loads since this would raise the demand over the assigned limit; otherwise, at 425 the ON/OFF load is requested on. If, however, IPERR remains positive (NO at 431), then at 427 the system goes for more loads, and by 430 loads are added until sufficient. Then, the system returns by 429. If, however, at 520 the load is found to be of the adjustable type, then from 520 the system goes to 521 with the decision to increase power on such load. If not possible, there is a return by 523. If possible, the system goes to 431 as before.

FIGS. 8C and 8D represent by flow charts the load seeking process of steps DNLN (433) and UPLN (422), respectively. These are subroutines of the control algorithm of FIG. 8B. Referring to FIG. 8C, the object is to find the next load to subtract power. The loads are taken in a fixed priority order and from the lowest order (step 525). If the selected load l is a valid selection at 526 the next questions are: at 463, is the CCI on AUTO?; at 464, is it a valid load?; at 465, is the load qualified for demand control? Then at 527 the determination is made whether it is an ON/OFF load, or not. If it is, at 466 the question is: "Is the load on AUTO in demand control?" At step 467: "Is the load l currently ON?" At 468: "Is the load l sheddable?" At 469: "Is the load l changing its status?" If the answer is Yes to all questions but the last, with a No to the last one, then load l is rightly the load to shed and this conclusion is drawn at step 470. The system then returns by 471 to step 435 of FIG. 8B. If the answer is No to any of the questions 463–468 or Yes to question 469, the system by 472 iterates, picking the next load down the memory by making PN=PN+1 at 532. When the loop has expired, if PN exceeds the maximum value of PN in the memory, the system concludes at 476 that it is unable to find a load to be shed. The system returns to the control algorithm of FIG. 8B (answer NO to 434). If the load is found (NO at 533) the system tries to shed the particular load. If, however, at 527 the conclusion reached is that the load is of the adjustable type, the system goes to 528, where it is determined whether PSET for such load is less or equal to LOSET. If we are already at LOSET, the load being already at its minimum there is no point decreasing, and the system goes to 532 for another iteration in the memory. If the answer is NO at 528, the deadband is exercised at 529. If PERR is outside the deadband, it is checked by 531 whether the load is OFF. Then, again the system goes by 472' to 532 for another iteration. If the load is ON, by 531' the system goes to 476. If inside the deadband, from 529 at 530 the question is whether PSET can be lowered? If NO, by 472' the system goes to 532 for another iteration. If YES, by 530' the load is effectively decreased at 470, and by 471 the system returns.

FIG. 8D indicates in a similar way how loads are restored or increased, as detailed in the subroutine as follows:

The load is picked up from the top of the priority list at 534 and 535. Then, the following questions apply: At 473, is the CCI on AUTO?; at 474, is the load valid?; at 475, is the particular load qualified for demand control? If at 536 the load is found to be an ON/OFF load, the questions are: At 476, is l on AUTO in demand control?; at 477, is the load currently OFF?; at 478, is the load restorable?; at 479, is l changing its status? If the answer is Yes for all preceding questions but the last while it is No for 479, then the load has been found and at 480 the system indicates that the selected load l is to be restored. Then, the subroutine returns back by 481 to the control algorithm of FIG. 8B. If, however, upon question 479 the answer is No, questions 473 to 479 are skipped and by 482 the subroutine indicates at 542 to reduce PN to PN-1. If at 543 PN increases to positive, it is known that at 501 no load to add can be found, and the system by 502 goes back to the control algorithm of FIG. 8B (answer NO to 423).

It is assumed now that at 536 the selected load is of the adjustable type. Then by 537 it is determined whether such load is already at HISET. If it is so, no more energy can be taken by the tap changer and the system goes by 482' and 545 to 542 for another iteration in the memory. If not, at 538 the deadband is energized. If outside the deadband by 538' and 541, the system again goes by 545 to 542 for another iteration, unless the load is ON and by 544 it must wait for PWRCON to adjust the load. If within the deadband at 538, the question is by 539 whether the PSET can be raised for such load. If YES, at 540 the load has been found and at 423 of FIG. 8B the system receives a positive answer. Otherwise, another iteration through the memory is called for by reducing PN further.

FIG. 8E shows the subroutine of the function PWRCON, called for at steps 512 and 513 on FIG. 8A, whenever a load of the adjustable type has been found, and according to 607 of FIG. 4, regulation in the inner loop in response to the PSET setting of the outer loop must be performed.

To this effect, Task TCC of FIG. 8E is initiated at 550 by putting the load number which corresponds to the meter m of the inner loop in question. If at 551 the load number LN is found to be for a valid, currently energized load at 552 PSET is forced to take a value between HISET and LOSET for this particular load. Then, at 553 the calculation is made of PERR=-PREF−PFBK. Thereafter, at 554, the question becomes whether PERR is smaller or equal to PDBND the deadband.

At this point, understanding of the flow chart requires a concurrent reference to FIG. 3 and block 110 therein. The controlling function within block 110 is defined by the output expressed in terms of the input which is PERR. The output is either zero (along the axis), or R (for raise) on the right side, or L (for lower) on the left side. In other words, block 110 will determine whether in tap changer block 101 the tap will be raised (R), lowered (L) or left OFF (O). When moving taps, as expressed in block 570 of FIG. 8E, R←O and L←1 indicate that the quantity ZERO is put into function R and the quantity ONE is put into function L in order to lower the tap. Similarly, block 571 indicates raising the tap, since the quantity ZERO is put into function L whereas the quantity ONE is put into function R. In contrast, block 563 indicates STOP TAPS, since the quantity ZERO is put into both functions R and L, as shown.

Referring again to FIG. 3, letters A B C D E F G H have been indicated to show operation between the deadband limits during control. AH and EF mark the abscissas OH and OE of the − and + outer deadbands, respectively for control to the left and to the right. BC and DG mark the − and + abscissas of the inner deadbands for control from the left and the right respectively. With these references, it is seen on FIG. 3 that when the error PERR is larger than the deadband (PDBND namely OH on the negative side, OE on the positive side), action on the tap is to a stop when the error reaches OC or OD of the inner deadband rather than OH or OE. This is to avoid erratic movements when the error correction changes sign. In the same manner, when the error increases actual for lowering (L) or raising (R) from a stop position movement will not be initiated until the error reaches OH or OE.

Referring to FIG. 8E, the small errors appear on the right side of block 554, e.g. if |PERR| is smaller or equal to the deadband. In such case by 556, the system goes to the question whether the tap is moving or not. If the tap is stopped then at 563, a zero is set into the function R (raise) and in the function L (lower). If the tap is moving by 558 the question becomes at 559. Is |PERR| far enough into the demand? The question is based upon the deadband (OC or OD) for a moving tap.

If the tap is moving, by 558 the question becomes is PERR far enough?, which means whether following R or L toward the deadband G or B have been reached. If it is so (errors OD or OC), then the tap is stopped, and by 562 the quantity is put into the functions R (raise) and L (lower) at 563. If it is not so, moving of the tap is allowed to continue by 560. Considering now the large errors (line 555 from 554 to the left), at 565 the system waits until the time has expired before moving the tap (thus it goes by 577) to wait until the constraint is lifted). Otherwise, by 566 tap action is allowed. By 567, the choice is between positive or negative error (PERR), thus between allowing to raise the tap (a ONE in R, a ZERO in L) at 571, or allowing to lower the tap (R←0, L←1).

The load timer is taken into account at 565 (control is allowed by 566 only if it has expired), and at 574 (the controlled load has to wait under the timer in order that the new constant power regulation may be established). This is not required on the right side where the error PERR is small since the object is merely to reach the "STOP position".

Both sides converge at junction point J, also at J come the NO of 565 by 577, and the NO of 551 by 564. From J the system makes an iteration for another meter m by 578, if there are other meters queued up to bid the function. The loop includes step 579 for update of m from the queue, and by 580 enters at 550 the operating cycle. If there is no other meter at 578, by 582 the step is to do an actual output to the tap changer hardware beyond the interface IF (FIG. 3) and at 583 to mark the function as available, and exit thereafter.

Flow chart 8F is at 585 for power up (PWRUP) or power down ([PWRDN]), in order to try to raise or ([lower]) PSET for an adjustable load, where is the load found at 480 by UPLN (FIG. 8D) or at 470 by DNLN (FIG. 8C). At 586 the question is whether PERR for that particular load (l) outside the deadband? If YES, by 588 the decision is not to continue to control (592) and the system returns.

I claim:

1. In a power demand control system for controlling loads drawing energy from a power source, at least one load being adjustable in reference to a level of power to be consumed including:

a power source meter common to said loads;

an individual power meter associated with said one adjustable load;

means responsive to said common power meter for selecting loads and for predicting a demand error relative to an assigned demand limit at the end of a control period, said demand error being predicted on a selection of available loads to be controlled for minimizing said demand error; and means responsive to said predicted demand error for effectively controlling such selected available loads;

the combination of:

means responsive to said predicted demand error and operative as a result of said one adjustable load being selected for establishing a reference setting point defining said reference level of power to be consumed by said adjustable load;

feedback means responsive to said individual power meter for providing a feedback error relative to said setting point and for establishing said reference level of power consumed by said adjustable load, thereby to change said reference level of power consumed by said adjustable load in accordance with said setting point, whereby said demand error is minimized.

2. The power demand control system of claim 1 with said adjustable load having assigned upper and lower limits for said adjusted level of power, said setting point establishing means being operative to adjust said one load to the extent of said limits.

3. The power demand control system of claim 2 with said upper and lower limits being modified as a function of said assigned demand limits.

4. The power demand control system of claim 3 in which said feedback means introduces deadband control in response to said adjusted level of power and to said individual power meter, said deadband control including a first deadband away from zero feedback error and a second deadband toward zero feedback error, said first deadband being larger than said second deadband.

5. The power demand control system of claim 4 with said feedback error being derived by calculating power in response to said individual power meter.

6. The power demand control system of claim 5, with said reference setting point being adjusted between said upper and lower limits as a function of a demand error anticipated at the end of a given control period, said adjustment being in a direction to compensate for said demand error.

7. The power demand control system of claim 6 including at least two of said adjustable loads, said selecting and predicting means selecting a first one of said two loads in accordance with a predetermined priority order to effect compensation of the demand error by adjustment of power with said first adjustable load, and effecting further compensation of said demand error by adjustment of power with said second adjustable load.

8. The power demand control system of claim 7 including at least one load available to be brought by switching into one of an ON and an OFF state, said selecting and predicting means being adapted to select in accordance with a predetermined priority order one of said adjustable loads and ON/OFF state loads and to control the selected load for minimizing a demand error anticipated at the end of a control period.

9. The power demand control system of claim 2 with said adjustable loads being adjustable between an upper and a lower limit, and said demand error is minimized by adjusting at least one adjustable load to one of said limits setting limits.

10. The power demand control system of claim 2 with said load selecting and demand error predicting means selecting one of said loads in accordance to a predetermined priority order and adjusting said selected load to minimize said demand error in which the adjustable loads are adjustable between an upper and a lower limit, and said demand error is minimized by adjusting at least one adjustable load to one of said limits and by adjusting another adjustable load to make the difference.

11. The power demand control system of claim 10 in which said upper and lower limits are modifiable as a function of the assigned demand limit.

12. The power demand control system of claim 10 in which each of said adjustable loads is provided with means for modifying the energy intake of such adjustable load from said power source, and said individual power adjusting means is controlling said energy intake modifying means, timer means being interposed between said individual power adjusting means and said energy intake modifying means to allow effective power adjustment by the selected adjustable load.

13. The power demand control system of claim 12 in which said energy intake modifying means is a tap changer associated with a corresponding adjustable load.

14. The power demand control system of claim 13 in which said tap changer has a maximum and a minimum position and said individual power adjusting means has a transform function responsive to said demand error for providing an adjustable reference defined between high setting and low setting limits.

15. The power demand control system of claim 1 including loads having an ON/OFF status that can be switched to change the amount of power drawn from said power source and a plurality of adjustable loads such as said adjustable load that can each be regulated to an adjusted power level to modify the amount of power drawn from said power source, with said demand error being minimized by one of (a) decreasing the power drawn through switching OFF a load of ON/OFF status, and (b) decreasing the power drawn through reducing the power level of a selected adjustable load.

16. The power demand control system of claim 1 including loads having an ON/OFF status that can be switched to change the amount of power drawn from said power source and a plurality of adjustable loads such as said adjustable load that can each be regulated to an adjusted power level to modify the amount of power drawn from said power source, with said demand error being minimized by one of (a) increasing the power drawn through switching ON a load of ON/OFF status, and (b) increasing the power drawn through raising the power level of a selected adjustable load.

* * * * *